US006813429B2

(12) United States Patent
Price et al.

(10) Patent No.: US 6,813,429 B2
(45) Date of Patent: Nov. 2, 2004

(54) SOURCES OF, AND METHODS FOR GENERATING, OPTICAL PULSES

(75) Inventors: Jonathan Hugh Vaughan Price, Cardiff (GB); Kentaro Furasawa, Tokyo (JP); David John Richardson, Southampton (GB); Tanya Monro, Southampton (GB)

(73) Assignee: University of Southampton, Southampton (GB)

( * ) Notice: Subject to any disclaimer, the term of this patent is extended or adjusted under 35 U.S.C. 154(b) by 63 days.

(21) Appl. No.: 10/120,965

(22) Filed: Apr. 10, 2002

(65) Prior Publication Data

US 2002/0168161 A1 Nov. 14, 2002

(30) Foreign Application Priority Data

Apr. 11, 2001 (GB) ............................................. 0109082
Jan. 17, 2002 (GB) ............................................. 0200955

(51) Int. Cl.[7] ............................. H01S 3/00; H01S 3/10; G02B 6/02; G02B 6/20
(52) U.S. Cl. ..................... 385/125; 385/122; 359/341.1; 359/341.3; 372/6; 372/22
(58) Field of Search ................................ 385/122–128; 359/341, 341.1–341.33; 372/6, 21, 22

(56) References Cited

U.S. PATENT DOCUMENTS

| | | | |
|---|---|---|---|
| 5,802,236 A | | 9/1998 | DiGiovanni et al. ........ 385/127 |
| 6,014,249 A | * | 1/2000 | Fermann et al. ......... 359/341.1 |
| 6,097,870 A | * | 8/2000 | Ranka et al. ................ 385/127 |
| 6,400,866 B2 | * | 6/2002 | Ranka et al. .................. 385/28 |
| 6,654,522 B2 | * | 11/2003 | Chandalia et al. ............ 385/48 |
| 6,658,183 B1 | * | 12/2003 | Chandalia et al. ............ 385/48 |

FOREIGN PATENT DOCUMENTS

EP        1 118 904 A1    7/2001    ............. G02F/1/35

OTHER PUBLICATIONS

Price, J.H.V. et al., "A Tuneable, Femtosecond Pulse Source Operating in the Range 1.06–1.33 Microns Based on an Yb Doped Holey Fiber Amplifier," Technical Digest. Summaries of Papers Presented at the Conference on Lasers and Electro–Optics. Postconference Technical Digest.
(IEEE Cat. No. 01CH37170), CLEO May 10, 2001, pp. CPD1–1–2, XP002228538 2001, Washington, DC, USA, Opt. Soc. America, USA, ISBN:1–55752–662–1.

N. Nishizawa and T. Goto, "Compact system of wavelength-tunable femtosecond soliton pulse generation using optical fibers," IEEE Photonics Technology Letters 11, 325–327 (1999).

M. E. Fermann, A. Galvanauskas, M. L. Stock, K. K. Wong, D. Harter and L. Goldberg, "Ultrawide tunable Er soliton fiber laser amplified in Yb–doped fiber," Optics Letters 24, 1428–1430 (1999).

X. Liu , C. Xu, W. H. Knox, J. K. Chandalia, B. J. Eggleton, S. G. Kosinski and R. S. Windeler, "Soliton self–frequency shift in a short tapered air–silica microstructure fiber," Optics Letters 26, 358–360 (2001).

J. K. Ranka, R. S. Windeler and A. J. Stentz, "Visible continuum generation in air–silica microstructure optical fibers with anomalous dispersion at 800 nm," Optics Letters 25, 25–27 (2000).

* cited by examiner

Primary Examiner—Akm Enayet Ullah
Assistant Examiner—Kevin S. Wood
(74) Attorney, Agent, or Firm—Stallman & Pollock LLP

(57) ABSTRACT

A source of optical pulses, comprises an optical source operable to generate ultrashort optical pulses at a first wavelength; and an optical fiber amplifier comprising an optical fiber having a core containing a dopant to provide optical gain at the first wavelength and anomalous dispersion over a wavelength range including the first wavelength and a second wavelength. The optical fiber receives the ultrashort optical pulses, amplifies the ultrashort optical pulses, and alters the wavelength of the ultrashort optical pulses to at least the second wavelength by the soliton-self-frequency shifting effect. Microstructured and/or tapered fibers can be used to provide the required dispersion characteristics. Pulses can be generated in one of three spectral regimes—monocolor solitons, multicolor solitons and continuous broadband spectra by adjusting the energy of the optical pulses, and tunability can be achieved by varying the power of pump light provided to the amplifier.

31 Claims, 16 Drawing Sheets

SOURCES OF, AND METHODS FOR GENERATING, OPTICAL PULSES

CROSS-REFERENCES TO RELATED APPLICATIONS

This application claims benefit to United Kingdom National Application No. 0109082.8 filed in English on Apr. 11, 2001 and United Kingdom National Application No. 0200955.3 filed in English on Jan. 17, 2002. The disclosures of these patent applications are incorporated herein by reference.

This application is related to co-pending U.S. patent application Ser. No. 10/146,219, entitled "Pulsed Light Sources."

BACKGROUND OF THE INVENTION

1. Field of the Invention

The present invention relates to sources of optical pulses and methods of generating optical pulses, particularly tunable pulses, by use of the soliton-self-frequency shifting effect in an optical amplifier based on doped holey fiber.

2. Description of the Related Art

Wavelength tunable ultrashort (femtosecond and picosecond duration) optical pulse sources have applications in areas as diverse as ultrafast spectroscopy, materials processing, optoelectronics, nonlinear optics and optical chemistry. Traditionally, femtosecond (fs) pulse sources have been based on bulk crystal materials (most commonly Ti:sapphire), and have employed passive mode-locking techniques, such as Kerr-lens mode-locking, that make use of fast intracavity saturable absorber effects. Whilst excellent performance characteristics have been achieved, and successful commercial products and application areas have been developed, these traditional sources offer a limited range of directly accessible wavelengths and continuous broadband tuning ranges, particularly above 1.1 $\mu$m. In general, extending this femtosecond technology to obtain broader tuning ranges and longer wavelengths requires the use of bulk parametric nonlinear devices such as optical parametric oscillators (OPOs), generators (OPGs), or amplifiers (OPAs), pumped by a bulk femtosecond laser. Such devices add to the complexity and cost, and increase the physical size of the overall system. Moreover, bulk crystal lasers require high-precision alignment and are often pumped by expensive, high-maintenance gas lasers. An alternative approach to obtain broadband tunability is to first generate a broadband supercontinuum spectrum and to spectrally filter out (pulsed) radiation at the desired wavelength (or wavelengths). This technique is commonly referred to as spectral slicing. A supercontinuum spectrum itself (unfiltered) also has many applications including metrology and optical coherence tomography and convenient/practical means to generate such broadband spectra are required. For many applications the spatial mode quality of the supercontinuum beam is an important issue and generally a high quality mode (e.g. a single transverse mode) across all wavelengths is required.

An attractive way of achieving tunability from an ultrashort pulse system is to use the soliton-self-frequency shift (SSFS) effect. The discovery of the SSFS effect in optical fibers was first reported in 1985–1986, and opened up the exciting possibility of obtaining widely wavelength tuneable femtosecond soliton pulses from a variety of optical sources, including fiber-based sources. Femtosecond pulses launched in a suitable optical fiber will propagate as solitons, and Raman frequency shifting within the spectra of the individual solitons gradually alters the wavelength of the pulses. The amount of alteration, or tuning, is governed by factors including pulse power, fiber material and fiber length.

Optical fiber requires certain characteristics to support the SSFS effect. A sufficient level of optical nonlinearity is required to enable solitons to develop and propagate. The nonlinearity experienced by a pulse depends on the amount of energy in the pulse, so pulses propagating in the fiber therefore need to have sufficient energy for soliton formation. Also, to obtain the self-frequency shift, the fiber needs to have anomalous dispersion over the wavelength range of interest, namely the wavelength of the initial launched pulses, and the required tuning range.

Various practical demonstrations of the SSFS effect have been reported. Nishizawa and Goto [1, 2] have reported SSFS in a standard polarization maintaining fiber, using femtosecond pulses from an erbium-doped fiber laser. A soliton output tunable over 1.56 to 1.78 $\mu$m was achieved. A further device using nJ pulses from an erbium-doped fiber laser and SSFS in a standard silica fiber has been reported by Fermann et al [3]. An alternative arrangement by Liu et al [4] uses a tapered microstructured silica fiber to provide SSFS of femtosecond nJ pulses from a Ti:sapphire-pumped OPO. The tapering and microstructuring of the fiber is used to give a large anomalous dispersion with a flattened profile in the wavelength region of interest, 1.3 to 1.65 $\mu$m. In each case, tuning is provided by varying the power of the pulses launched in the fiber.

However, the use of conventional silica fiber for SSFS has limitations, in that it is only possible to obtain anomalous dispersion for wavelengths beyond ~1.3 $\mu$m. This precludes the use of SSFS for achieving tunability in the desirable but difficult to access wavelength region of 1 to 1.3 $\mu$m. Also, the anomalous dispersion and nonlinearity available may be less than optimal for any particular tuning range of interest.

Furthermore, as mentioned, relatively high pulse energies are required to exploit the fiber nonlinearity sufficiently to achieve soliton propagation. Typically, nJ pulses have been used in the prior art. This requirement puts limitations on the laser sources which can be used to drive the SSFS effect. Also, this may have an adverse effect on the available tuning, because tuning is typically achieved by varying the pulse energy/power.

BRIEF SUMMARY OF THE INVENTION

The present invention seeks to address the limitations of the prior art by providing a more versatile tunable ultrashort optical pulse source based on the SSFS effect. This is achieved by using, as the SSFS medium, in one embodiment, a holey fiber having a doped core and configured as an amplifier. The unusual properties of holey fibers, and also, to some extent, tapered fibers, can be exploited to provide a fiber with anomalous dispersion at virtually any desired wavelength, so that it is possible to access wavelength regions not attainable with conventional fibers, including 1 to 1.3 $\mu$m and below. Also, such fibers can be tailored to have a much greater nonlinearity than conventional fibers, so that lower pulse energies can be used to achieve solitonic operation. The present invention can be readily utilised using pJ pulse energies.

The ability to use lower pulse energies is further enhanced by configuring the fiber as an amplifier. Providing internal amplification in this way allows the use of low energy pulses which are then amplified within the fiber until they have sufficient energy to experience the nonlinearity of the fiber, propagate as solitons, and then undergo SSFS. Thus, a wide range of pulsed sources are suitable for use in the present invention, given the minimal limitations on both power and wavelength. For example, wavelength shifting of relatively low energy pulses directly from a simple diode-pumped fiber oscillator is possible. Moreover, the use of an amplifier allows the tuning of the SSFS to be achieved by varying the power of the amplifier pump source, instead of the prior art method of varying the output power of the pulse source. This decoupling of the wavelength tuning from the operation of the pulse source can be advantageous in practice since the fundamental pulse source is left running and does not need to be adjusted at all to effect wavelength tuning of the system output Furthermore, the distributed amplification process offers tuning over a broader frequency range than has hitherto been possible with the passive SSFS devices of the prior art; an embodiment of the present invention has produced femtosecond pulses at wavelengths as long as 1.58 $\mu$m from pulses having a wavelength of 1.06 $\mu$m, corresponding to a frequency shift of 69 THz, which is one third the frequency of the input pulses. The source configuration can also be used to generate pulsed output with an ultra-broadband optical spectrum. The generation of this ultra-broad optical spectrum relies upon supercontinuum generation/effects within these highly nonlinear fibers.

Accordingly, a first aspect of the present invention is directed to a source of optical pulses, comprising: an optical source operable to generate ultrashort optical pulses at a first wavelength; and an optical fiber amplifier comprising an optical fiber and a pump source operable to deliver pump radiation to the optical fiber, the optical fiber having a core containing a dopant to provide optical gain at the first wavelength, and anomalous dispersion over a wavelength range including the first wavelength and a second wavelength, and being arranged to receive the ultrashort optical pulses, amplify the ultrashort optical pulses, and alter the wavelength of the ultrashort optical pulses to at least the second wavelength by the soliton-self-frequency shifting effect.

The optical fiber may be configured as a microstructured fiber containing an array of air holes running along the length of the fiber, or alternatively as a tapered fiber. In either case, it is possible to tailor the dispersion properties of the fiber to permit use of the SSFS effect over a desired wavelength range, so that pulses having a particular wavelength can be generated.

In one embodiment, the dopant comprises ytterbium ions, to provide optical gain at a wavelength of approximately 1 $\mu$m. Wavelengths around one micron cannot be accessed using SSFS in passive devices using standard optical fiber owing to the dispersion properties of such fiber. Hence, ytterbium doping gives gain at these wavelengths, which together with suitable fiber dispersion characteristics, can be used to generate these wavelengths via SSFS.

Alternatively, the dopant comprises ions of one or more of erbium, neodymium, ytterbium, holmium, thulium, praseodymium, germanium, aluminium, boron, samarium, lead and tin. These other dopants allow/enhance gain, and subsequent wavelength shifting, at a variety of wavelengths. For example, aluminium can enhance/extend the gain bandwidth provided by rare earth dopants. Also, some of the dopants can be used to improve the nonlinear coefficient, and/or enhance the Raman gain in addition to or instead of enhancing the optical gain.

Advantageously, the optical source comprises a laser having an optical gain medium in the form of an optical fiber. With appropriate selection of the pump laser, this gives a wholly fiber-based device, with the known advantages of such systems, such as stability and robustness.

Further, the laser may have an optical gain medium comprising an optical fiber doped with ions of ytterbium and operable to generate ultrashort optical pulses at a wavelength of approximately 1 $\mu$m. With appropriate choice of fiber dopant, such as ytterbium, to give gain at this wavelength, the source can produce pulses in the 1.1 to 1.3 $\mu$m range, which is difficult to access using prior art devices.

In a preferred embodiment, the pump radiation delivered to the optical fiber can be varied in power, so as to vary the second wavelength within the wavelength range of the anomalous dispersion of the optical fiber of the optical fiber amplifier. This gives an effective way of providing a tunable output, without any disturbance to the optical source being necessary.

In one embodiment, the ultrashort optical pulses are delivered to the optical fiber of the optical fiber amplifier with sufficient power for the soliton-self-frequency shifting effect to alter the wavelength of the ultrashort pulses to the second wavelength and to one or more additional wavelengths within the wavelength range of the anomalous dispersion of the optical fiber of the optical fiber amplifier. Operation in this regime gives an output of multicolored solitons.

In a further embodiment, the ultrashort optical pulses are delivered to the optical fiber of the optical fiber amplifier with sufficient power for the soliton-self-frequency shifting effect to alter the wavelength of the ultrashort pulses to a broadband continuous spectrum. Supercontinuum spectra of this type have many applications, including metrology, spectroscopy and optical coherence tomography.

The source of optical pulses may further comprise an optical pre-amplifier operable to receive the ultrashort optical pulses from the optical source and amplify the ultrashort optical pulses before the ultrashort optical pulses are received by the optical fiber of the optical fiber amplifier. Pre-amplification can be used to increase the energy of the ultrashort optical pulses if necessary, for example, for operation in the broadband regime. The pre-amplifier may comprise an optical fiber amplifier or a bulk optic amplifier.

A second aspect of the present invention is directed to a method of producing optical pulses, comprising: generating ultrashort optical pulses at a first wavelength; amplifying the ultrashort optical pulses in an optical fiber amplifier; and altering the wavelength of the ultrashort optical pulses from the first wavelength to at least a second wavelength by the soliton-self-frequency shifting effect within the optical fiber amplifier; the optical fiber amplifier comprising an optical fiber having a core containing a dopant to provide optical gain at the first wavelength, and anomalous dispersion over a wavelength range including the first wavelength and a second wavelength.

The method may further comprise varying an amount of pump radiation delivered to the optical fiber amplifier so as to vary the second wavelength. This is a simple way of achieving a tunable output, without the need to impinge on the generation of the ultrashort optical pulses.

The desired dispersion characteristics may be attained by configuring the optical fiber of the optical fiber amplifier as a microstructured fiber containing an array of air holes running along the length of the fiber, or alternatively. as a tapered fiber.

The ultrashort optical pulses may be generated from a laser having an optical gain medium in the form of an optical fiber, and the optical fiber may be doped with ions of ytterbium.

In one embodiment, the method further comprises delivering the ultrashort optical pulses to the optical fiber amplifier with sufficient power for the soliton-self-frequency shifting effect to alter the wavelength of the ultrashort pulses to the second wavelength and to one or more additional wavelengths within the wavelength range of the anomalous dispersion of the optical fiber of the optical fiber amplifier.

In an alternative embodiment, the method further comprises delivering the ultrashort optical pulses to the optical fiber amplifier with sufficient power for the soliton-self-frequency shifting effect to alter the wavelength of the ultrashort pulses to a broadband continuous spectrum.

The method may further comprise amplifying the ultrashort optical pulses in an optical pre-amplifier before amplifying the ultrashort optical pulses and altering the wavelength of the ultrashort optical pulses in the optical fiber amplifier. The pre-amplifier may comprise, for example, an optical fiber amplifier, or a bulk optic amplifier.

BRIEF DESCRIPTION OF THE SEVERAL VIEWS OF THE DRAWINGS

For a better understanding of the invention and to show how the same may be carried into effect reference is now made by way of example to the accompanying drawings in which.

DETAILED DESCRIPTION OF THE INVENTION

Figure 1:
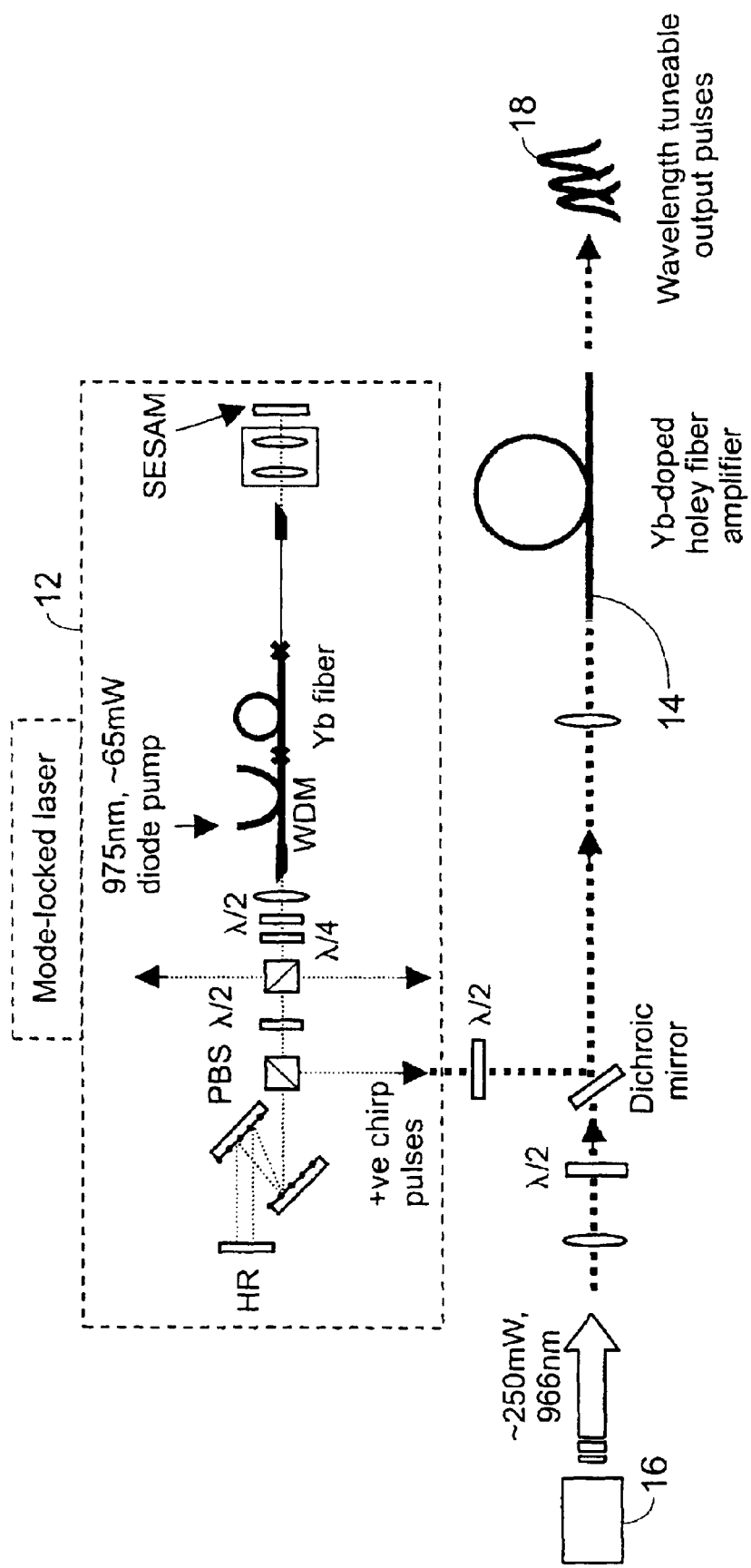
FIG. 1 shows a schematic diagram of a source of optical pulses according to a first embodiment of the present invention.

Brief discussions of the soliton-self-frequency shift (SSFS) effect and of holey fibers are now given, before embodiments of the present invention are presented.

Soliton-Self-Frequency Shift

The SSFS effect occurs in ultrashort pulses propagating in an optical fiber having suitable characteristics, and is caused by stimulated Raman scattering. Silica glass is an amorphous material, rather than crystalline and this means that the Raman gain spectrum of the material is very broad, so that Raman scattering can occur within the broad spectrum of the individual ultrashort pulses.

The effects of this intra-pulse stimulated Raman scattering transfer the energy from the high frequency part of the pulse spectrum to the low frequency part. If the pulse is a soliton then this destabilises the pulse and ultimately results in break-up of the pulse into a peak and pedestal, and most importantly, to the formation of a Raman soliton. The Raman soliton pulse is a stable entity, which, due to the SSFS effect, continuously downshifts its central frequency (moves to longer wavelengths) as it moves along the amplifier. It should be noted that the SSFS process is strongly dependent on the pulse duration as the rate of frequency shift is proportional to $\Delta\tau^{-4}$, where $\Delta\tau$ is the full-width half-maximum (FWHM) duration of the pulse. By altering a number of parameters, such as the length of the fiber, or the power of the pulses as they are launched into the fiber, it is possible to change the final wavelength to which the pulses are shifted. Thus, a tunable system can be achieved.

To obtain the SSFS effect, certain fiber characteristics are required. Sufficient optical nonlinearity is required for the formation of solitons. Also, the fiber needs to have anomalous dispersion over a wavelength range that includes both the initial wavelength of the pulse launched into the fiber, and also extends out to the maximum wavelength to which frequency shifting is desired. In a tunable system, this wavelength range will hence include the desired tuning range.

Holey Fibers

Holey, or microstructured; fibers are of great practical interest because the incorporation of air holes extending along the entire length of the fiber to define the cladding region allows for an increased range of fiber parameters compared to conventional fiber. In particular, the large refractive index difference between air and glass leads to a range of unique dispersion and nonlinear properties. As an example, the dispersion of a holey fiber has been shown to be particularly sensitive to the hole arrangement, and a wide range of dispersion properties have been demonstrated, including anomalous dispersion down to visible wavelengths [5], broadband flattened dispersion or large normal dispersion. Hence, holey fibers can be tailored to provide anomalous dispersion at a desired wavelength range, thus making them suitable for use in the SSFS devices of the present invention. Also, the effective mode area in a holey fiber can be tailored by up to three orders of magnitude by altering the scale of the transverse refractive index profile. This opens up possibilities for fibers with either high or low optical nonlinearities as required for a wide variety of applications. In the present invention, therefore, the high nonlinearity desirable for soliton formation can be readily achieved.

Holey fibers fabricated from silica to have anomalous dispersion at wavelengths below, say, 1.3 $\mu$m, must have a small core (typically <2.5 $\mu$m diameter) and a high air fill fraction in the cladding. This results in a strong (anomalous) waveguide contribution to the dispersion to compensate for the (normal) material dispersion of silica at these wavelengths. The small core naturally leads to the fiber having an exceptionally high effective nonlinearity, which is ideal for soliton generation, as required in the present invention. Using high nonlinearity holey fibers of this type for SSFS devices, pJ pulse energies (~200 W typical peak power) and meter long fiber lengths are all that is required for solitons to form. Such power levels and fiber lengths are at least an order of magnitude lower than those required for prior art devices using conventional fiber types.

First Embodiment

The first embodiment of the present invention is a continuously tunable source of optical soliton pulses operable over the wavelength range 1.06–1.33 $\mu$m and based on SSFS in holey fiber technology. The source comprises an ytterbium ($Yb^{3+}$)-doped holey fiber amplifier seeded with pulses at 1.06 $\mu$m from an $Yb^{3+}$-doped, fiber-based mode locked laser oscillator. The 1.0–1.3 $\mu$m wavelength range is of practical significance, for example a 1.24 $\mu$m source is optimal for many 3-photon microscopy applications. However, ultrafast pulses in this wavelength range are difficult to access by conventional means, except as previously mentioned, through the use of research-grade OPOs.

FIG. 1 shows a schematic diagram of the first embodiment. A source of optical pulses 10 comprises an optical source 12 and an optical fiber amplifier 14. The optical source 12 comprises an $Yb^{3+}$-doped fiber laser operable to generate ultrashort optical (seed) pulses, and the optical fiber amplifier 14 comprises an $Yb^{3+}$-doped holey fiber amplifier. The optical source 12 is a mode-locked laser operable to generate ultrashort pulses at a wavelength of 1.06 $\mu$m with a positive linear chirp. The pulses are launched into the anomalously dispersive, $Yb^{3+}$-doped holey fiber amplifier 14, together with a separate beam of pump radiation from a pump laser 16 in the form of a diode laser, that controls the gain of the amplifier 14. As a result of the amplification and nonlinear pulse evolution of the pulses as they pass through the amplifier 14, Raman solitons form and are continuously wavelength shifted through the SSFS effect. The nonlinear evolution of the pulses depends critically on the pulse peak power, so the wavelength of the pulses 18, in the form of Raman solitons, at the output of the amplifier 14 is tuned by varying the gain in the amplifier, which is controlled by varying the power of the pump radiation from the pump laser 16. In this way, single wavelength (monocolor) soliton output pulses 18 can be wavelength-tuned throughout the 1.06–1.33 $\mu$m range.

Figure 2:
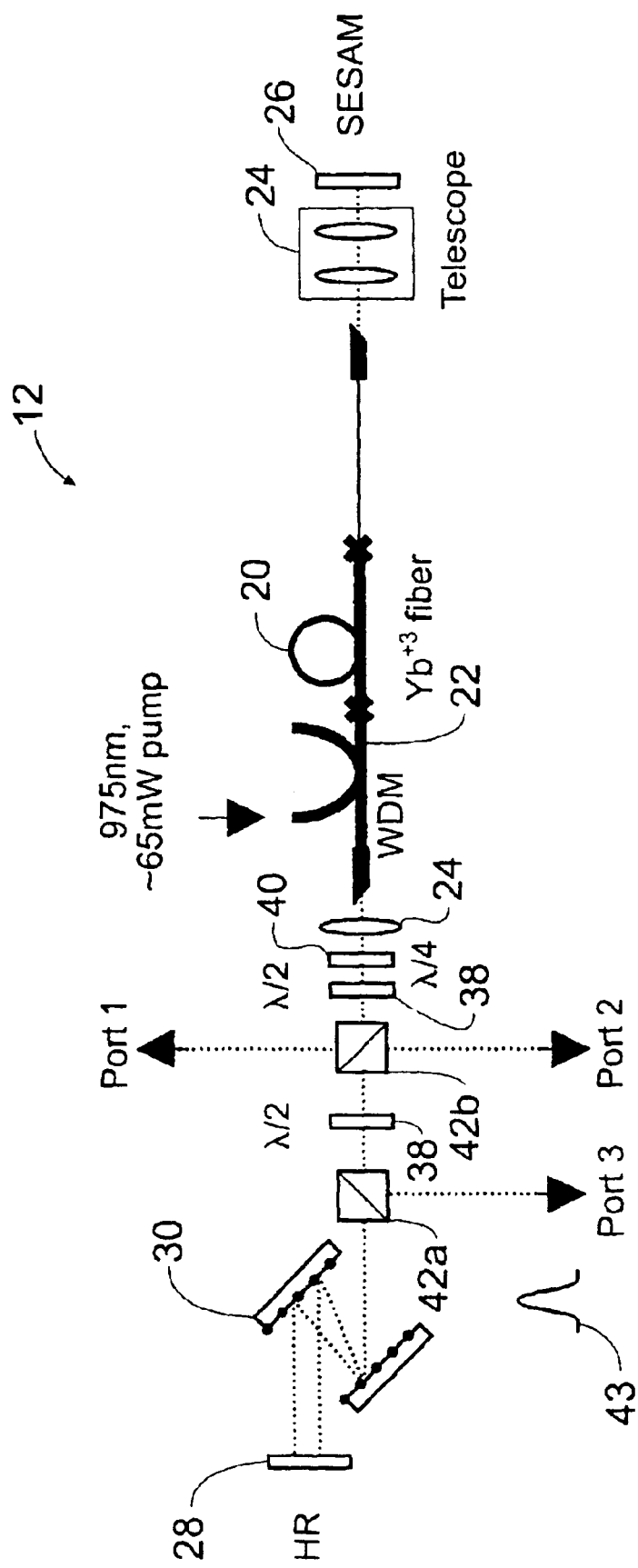
FIG. 2 shows a schematic diagram of an optical source forming part of the source of FIG. 1.

FIG. 2 is a more detailed schematic diagram of the optical source 12. The optical source 12 is a fiber laser having as a gain medium an optical fiber 20 doped with $Yb^{3+}$ ions to give laser oscillation at 1.06 $\mu$m. The gain medium fiber 20 is spliced to a fiber coupler 22, through which pump light at 975 nm is coupled into the gain medium fiber 20. The pump light is generated by a diode laser (not shown).

The gain medium fiber is arranged within a laser cavity having a Fabry Perot geometry, and defined at one end by a high reflector 28 and at the other by a semiconductor saturable absorber mirror (SESAM) 26. Various focussing optics 24, half wave plates 38 and quarter wave plates 40 are disposed within the cavity, together with a bulk grating pair 30, adjacent to the high reflector 28.

Ultrashort pulse operation of the optical source 12 is achieved by use of stretched pulse modelocking, employing nonlinear polarization rotation within the gain medium fiber 20 as a fast saturable absorber. The SESAM 26 facilitates reliable self-start modelocking.

The cavity further comprises a pair of polarizing beam splitters (PBS) 42, to give outputs from the optical source 12. The form of the output depends on position and direction of the PBS within the cavity. The PBS 42a closest to the high reflector 28 gives an output of ultrashort optical pulses having positive chirp, whereas the PBS 42b closest to the gain medium fiber 20 gives pulses with negative chirp.

Figure 3A:
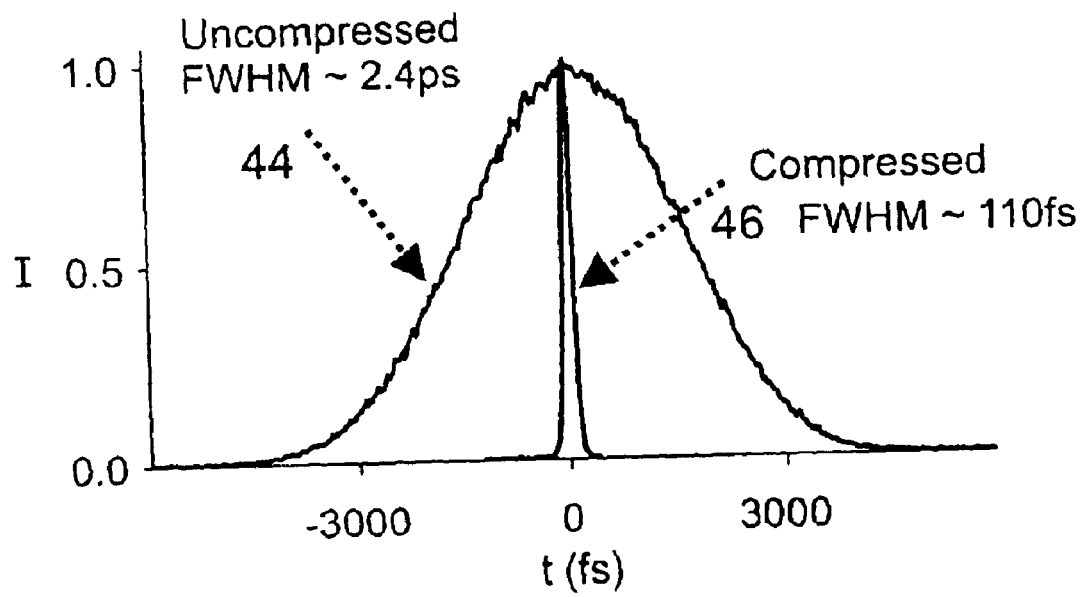
FIG. 3 shows an autocorrelation and spectrum of pulses generated by the optical source of FIG. 2.
Figure 3B:
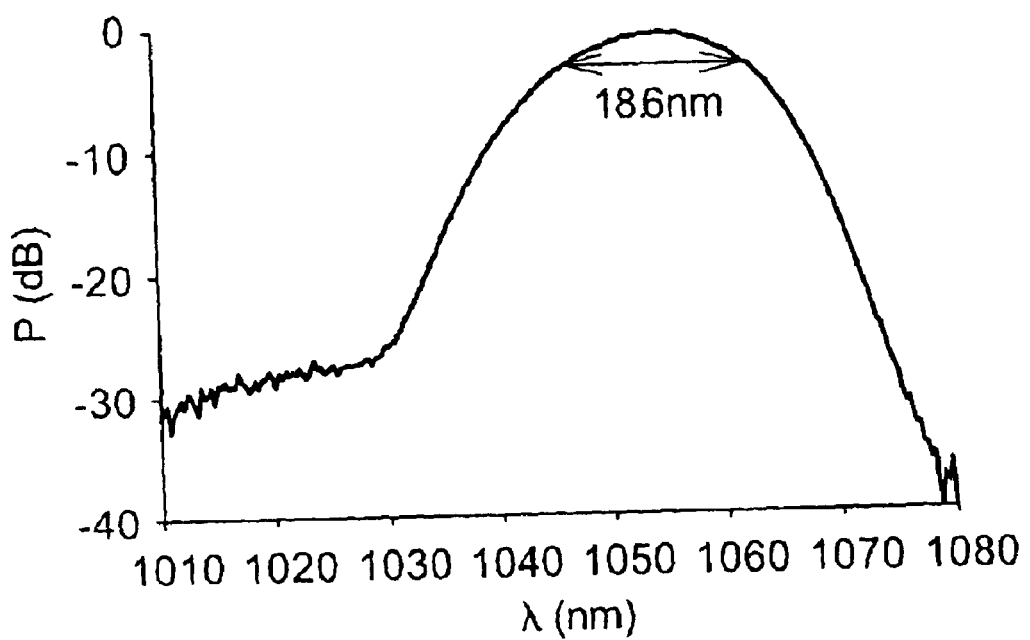

FIGS. 3(a) and 3(b) show measured characteristics of typical pulses from the optical source 12.

FIG. 3(a) is a second harmonic autocorrelation trace (Intensity I against delay t) of the positively chirped pulses 43 which leave the cavity via PBS 42a. On leaving the cavity, the pulses have a duration of ~2.4 ps (trace 44), but can be compressed to 108 fs with an external cavity diffraction grating pair (trace 46).

FIG. 3(b) is a plot of the spectrum (power P against wavelength $\lambda$) of the positively chirped pulses, showing a peak at ~1.06 $\mu$m, and a bandwidth of 18.6 nm. Note that the smooth spectrum over the wide dynamic range of the measurement instrument facilitates observation of nonlinear spectral distortion.

The average output power of the optical source is ~3 mW at a pulse repetition rate of 54 MHz, indicating a pulse energy of ~60 pJ. The laser output is stable, and the amplitude noise is measured to be ~0.05%. The laser therefore represents a very attractive and practical seed for Raman-soliton SSFS devices, which are highly sensitive to amplitude noise.

Figure 4:
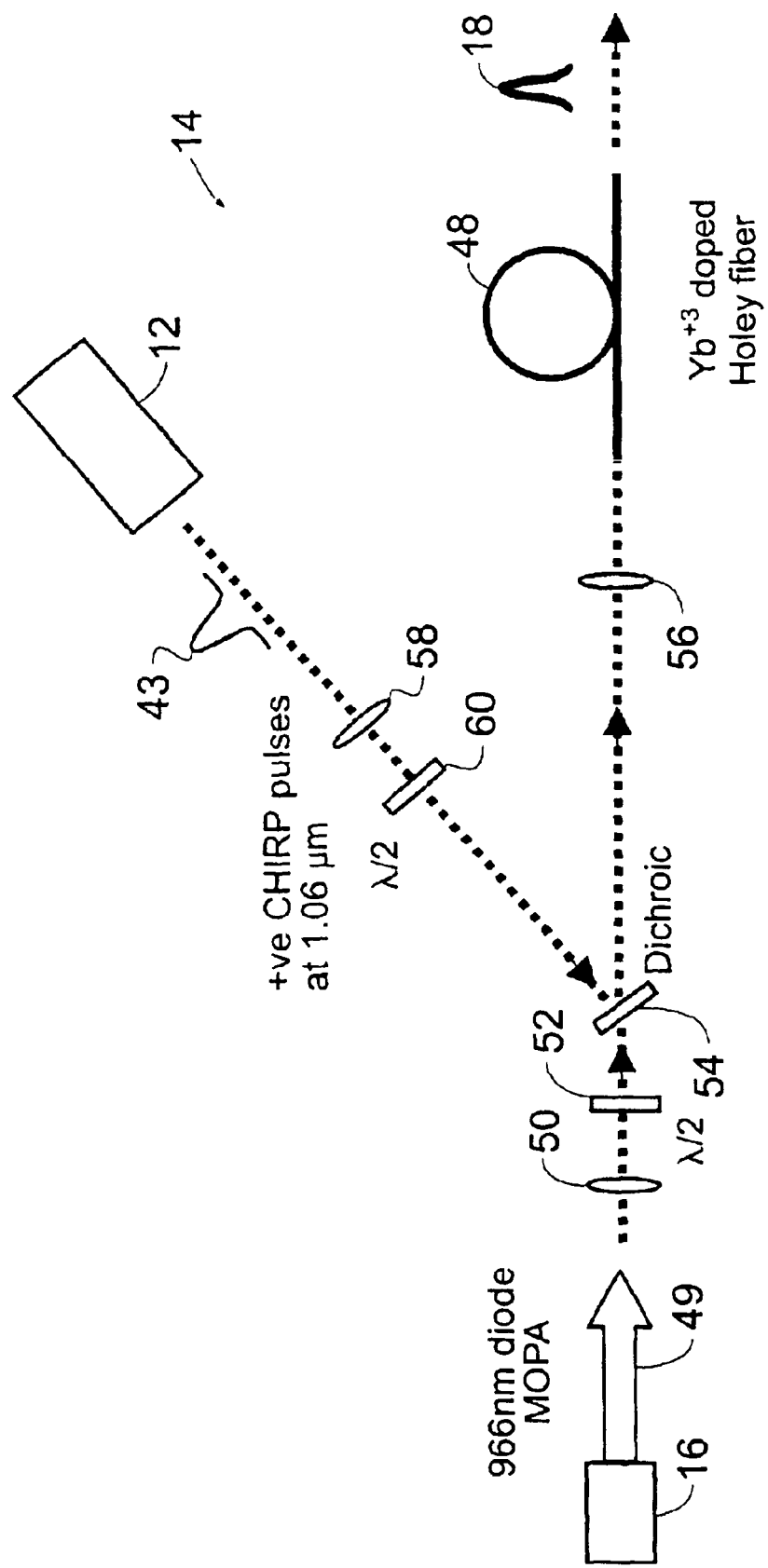
FIG. 4 shows a schematic diagram of an optical fiber amplifier forming part of the source of FIG. 1.

FIG. 4 shows a detailed schematic diagram of the optical fiber amplifier 14. The amplifier 14 comprises a holey fiber 48 and a pump laser 16. The pump laser in this instance is a diode-based master oscillator power amplifier (MOPA) operable to generate pump radiation 49 at a wavelength of 966 nm, with a maximum power of ~250 mW. The pump radiation 49 is collimated by a collimating lens 50 and passed through a half-wave plate 52. The half-wave plate 52 can be used to match the polarization of the pump radiation 49 to the principle axis of the holey fiber 48, but operation of the amplifier 14 is largely insensitive to the pump radiation polarization. The choice of a MOPA based pump laser in this setup is somewhat unusual and relates directly to the equipment readily available to the inventors. The MOPA may conveniently be replaced with a conventional single-mode semiconductor laser diode operating some-where in the range 910 nm–985 nm, or indeed at any other suitable pumping wavelength for the rare earth dopant contained within the amplifier. The pump laser might also be a diode pumped solid state laser, or a broad-stripe (multimode) laser diode operating at a suitable pump wavelength.

A dichroic mirror 54 is provided for coupling light into the holey fiber 48. The pump radiation 49 is transmitted through the dichroic mirror 54, and focussed into the holey fiber 48 by a lens 56.

Similarly, the beam of positively chirped ultrashort optical pulses 43 generated by the optical source 12 is collimated by a collimating lens 58 and passed through a half-wave plate 60. The half wave plate 60 is used to match the polarization of the beam of pulses 43 to the principal axis of holey fiber. The beam is reflected off the dichroic mirror 54, and focussed into the holey fiber by the same lens 56 used to focus the pump radiation 49. Thus, in this embodiment the amplifier 14 is co-directionally pumped with positively chirped pulses. However, the invention is not limited to this arrangement, and other configurations, using, for example, forward pumping of the amplifier 14, and/or transform-limited or negatively chirped pulses, are possible.

The coupling arrangement of the dichroic mirror 54 and the lens 56 gives approximately 20% coupling efficiency into the holey fiber 48 for both the ultrashort pulses 43 and the pump radiation 49. Thus the maximum energy of the ultrashort pulses 43 received by the holey fiber 48 is ~10 pJ, and the pump radiation directed into the holey fiber is up to ~50 mW. Note that it is possible to envisage other means of coupling the pump radiation into the core of the optical fiber using for example a fused tapered coupler, filter based coupler, a side-coupling fiber coupler, or a grating assisted coupler. It is also possible to envisage using a cladding pumped holey fiber as the anomalously dispersive fiber amplifier and then using a broad stripe diode to launch the pump radiation into the cladding region of the fiber and which is then absorbed within the fiber core by the active dopant.

The holey fiber 48 has a core doped with $Yb^{3+}$ ions, to give optical gain at the wavelength of the ultrashort pulses as they are received by the holey fiber 48, 1.06 $\mu$m. Hence the holey fiber 48 is suitable for amplification of the ultrashort pulses 43. In the first embodiment, the holey fiber 48 has a typical length of between 1.7 m and 9 m, although other lengths can be used in this and other embodiments, both to enhance overall performance of the source of optical pulses, and to give pulses with desired characteristics, such as wavelength.

Figure 5:
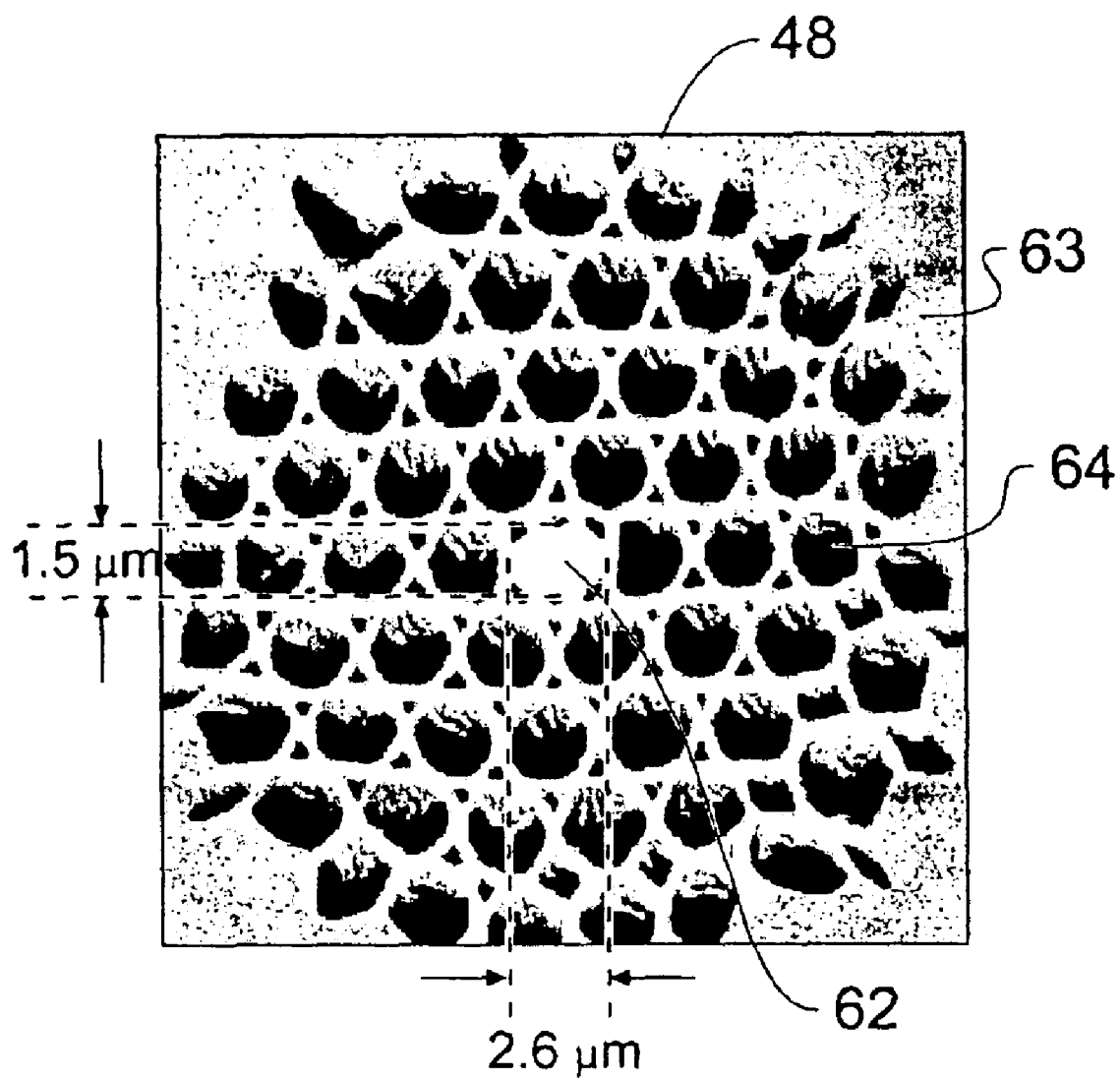
FIG. 5 shows a scanning electron micrograph of a transverse cross-section of a holey fiber forming part of the amplifier of FIG. 4.

FIG. 5 shows a scanning electron micrograph (SEM) of a transverse cross-section of the holey fiber 48. The fiber core 62, comprising silica doped with $Yb^{3+}$ ions, is surrounded by a silica cladding region 63 comprising air holes 64 which run the length of the fiber 48.

The silica cladding region 63 is fabricated using standard capillary stacking techniques for making holey fibers. An $Yb^{3+}$-doped solid silica rod is used to form the core 62. The core 62 is approximately 2 $\mu$m in diameter, and the surrounding cladding 63 is largely composed of air. These factors combine to result in tight confinement of the guided mode to the fiber core 62. Hence the holey fiber 48 has an extremely high effective nonlinearity coefficient $\gamma = n_2/A_{eff}$, where $n_2$ is the intrinsic material nonlinearity and $A_{eff}$ is the effective mode area. This high nonlinearity allows short fiber lengths to be used for SSFS. The holey fiber 48 is observed to be strictly single mode for all wavelengths considered here in this first embodiment, including the 966 nm pump radiation wavelength.

$Yb^{3+}$ ions are incorporated across the central 1.7 $\mu$m of the core 62, to a concentration of 2000–3000 ppm, as estimated from white light measurements on fibers drawn from an unetched $Yb^{3+}$-doped fiber preform used to fabricate the rod used to form the core 62.

In order to predict the dispersion properties and mode field diameter of the doped holey fiber 48 described in the first embodiment, numerical techniques have been used. The approach is a hybrid modal method, in which the complex transverse refractive index structure is described using a Fourier decomposition, and the guided mode(s) by localised Hermite-Gaussian functions. For the purposes of predicting the properties of the holey fiber 48, the SEM photograph shown in FIG. 5 was used to define the refractive index distribution used in the numerical model. In this way the influence of any distortions/irregularities in the otherwise periodic structure can be accounted for in the resulting predictions. Due to the large air fill fraction it is necessary to use a full vector model in order to make accurate predictions, and both even and odd terms have been used in the modal expansions, to ensure that any asymmetries in the fiber profile can also be modelled accurately. The material dispersion of silica was included explicitly in these calculations.

As a consequence of the combination of core asymmetry, high refractive index contrast and the small scale of the structure, the holey fiber 48 is extremely birefringent (strongly polarization maintaining). This high birefringence is the reason why the half-wave plate 60 used to match the polarization of the beam of pulses 43 to the principal axis of holey fiber 48 is required.

Figure 6:
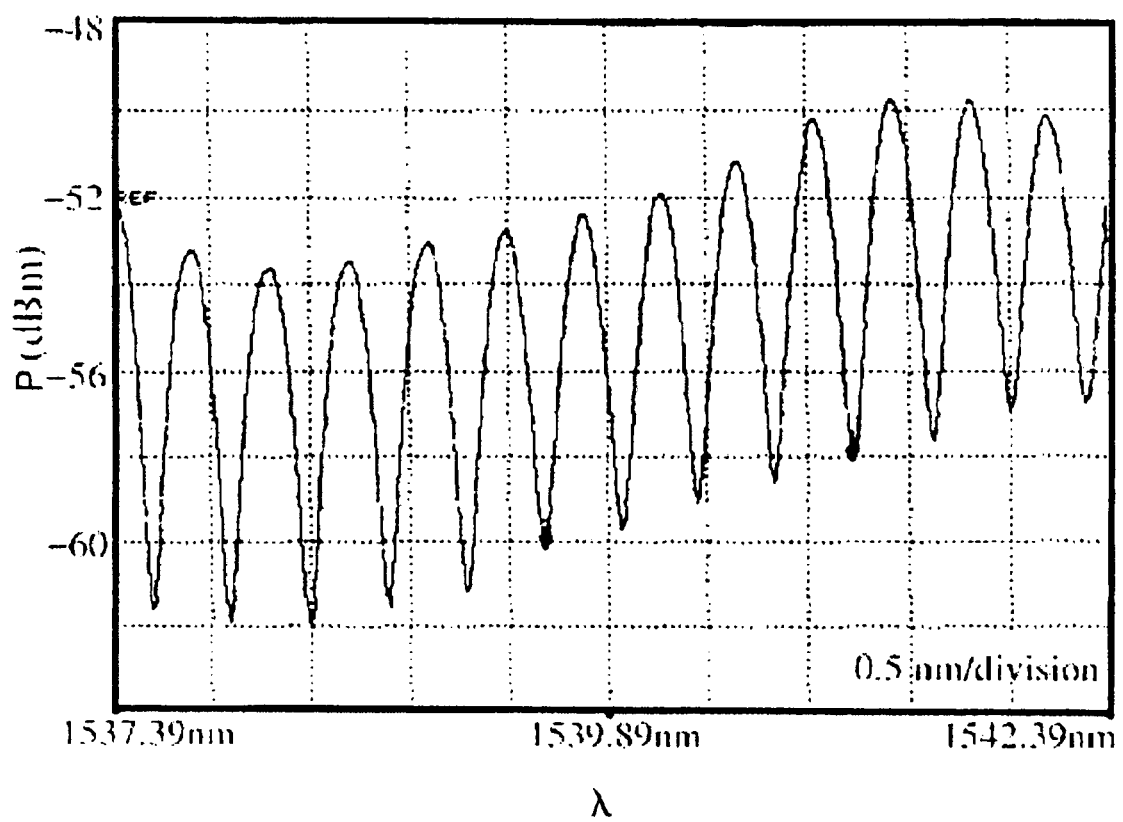
FIG. 6 shows a plot of the transmission characteristics of polarized broadband light at 1540 nm through crossed polarizers and a 1.2 m length of the holey fiber shown in FIG. 5.

FIG. 6 shows a plot of the transmission characteristics (power P against wavelength $\lambda$) of polarized broadband light at 1540 nm through crossed polarizers and a 1.2 m length of the holey fiber. From a measurement of the spectral period of the transmission a birefringent beat length of 0.3 mm at 1.54 $\mu$m is estimated. This agrees well with a prediction of 0.27 mm derived using the model described above. As far as is known, this is one of the shortest beat lengths ever obtained for an optical fiber.

Figure 7:
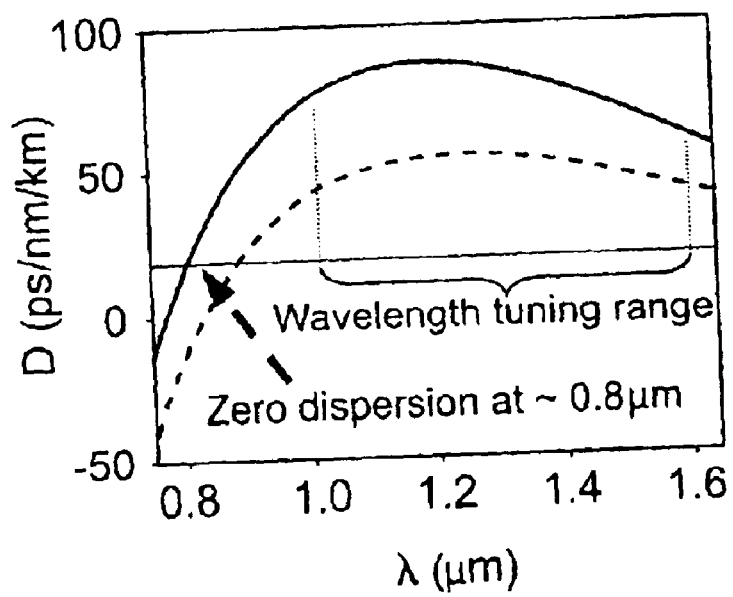
FIG. 7 shows a plot of the dispersion of the holey fiber of FIG. 5, derived by modelling.
Figure 8:
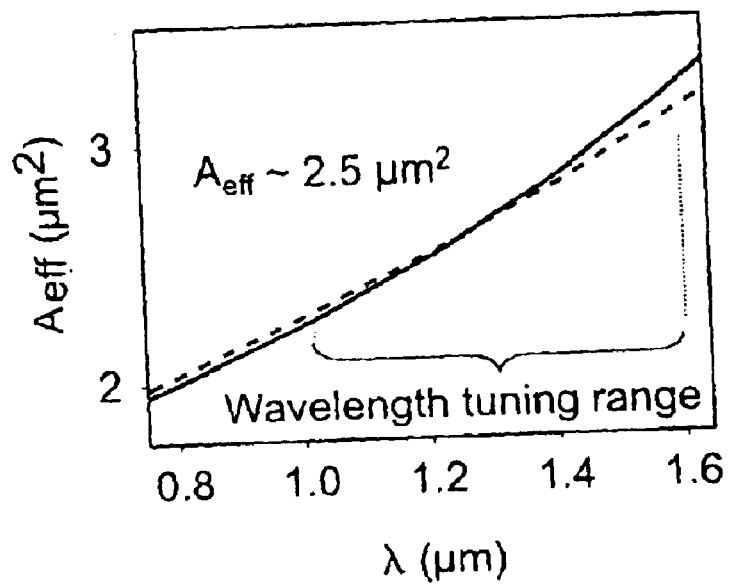
FIG. 8 shows a plot of the mode area of the holey fiber of FIG. 5, derived by modelling.

FIGS. 7 and 8 show some of the results obtained from the model. To demonstrate the effect of the fiber asymmetry, results are shown for both polarization axes (solid and dashed lines).

FIG. 7 shows a plot of the variation of dispersion D as a function of wavelength $\lambda$. The dispersion properties of the two polarization axes are markedly different, which indicates that the dispersion is sensitive to the arrangement of holes 64 in the fiber cladding 63. The zero dispersion wavelengths (above which the dispersion is anomalous (positive)) for the separate polarization axes are at 770 nm and 830 nm respectively, and at a wavelength of 1.06 $\mu$m the dispersion on the two axes differs by ~35 ps/(nm.km).

FIG. 8 shows a plot of the variation of mode area $A_{eff}$ as a function of wavelength $\lambda$. The mode area $A_{eff}$ does not differ greatly on the separate polarization axes, which indicates that $A_{eff}$ is much less sensitive to the hole arrangement compared to the dispersion. $A_{eff}$ is ~2.5 $\mu m^2$ at a wavelength of 1.55 $\mu$m, which is approximately 30 times smaller than for a standard single mode fiber (e.g. Corning SMF28). Also, $A_{eff}$ increases with increasing wavelength, indicating that the mode is more tightly confined to the fiber core at shorter wavelengths. As an indication of the fiber's nonlinear properties, for a 200 fs (FWHM) pulse at 1.06 $\mu$m propagating within the fiber, the fundamental soliton power and soliton period are approximately 50 W and 60 cm, respectively. As mentioned previously, these values are significantly lower than the comparable values reported in the prior art for SSFS in a standard fiber (at wavelength of ~1.5 µm).

The relatively flat dispersion curves, particularly in the 1.0 to 1.3 µm wavelength range, combined with the high effective nonlinearity of the fiber, facilitate good wavelength tuning through the SSFS effect Operation of the source of optical pulses 10 via the SSFS effect is as follows:

The ultrashort optical pulses 43 are generated by the optical source 12, and arc coupled into the holey fiber 48 of the amplifier 14 together with the pump radiation 49 generated by the pump laser 16. The wavelength of the pulses, which can be considered as a first wavelength, is in this case 1.06 µm.

The pulses 43 entering the amplifier 14 have a positive linear chirp and a peak power substantially below that required for soliton formation. The pulses 43 have a duration of 2.4 ps, a peak power of ~5 W, and a chirp of ~0.15 ps/nm, and can be compressed to ~110 fs using a grating pair.

Figure 9:
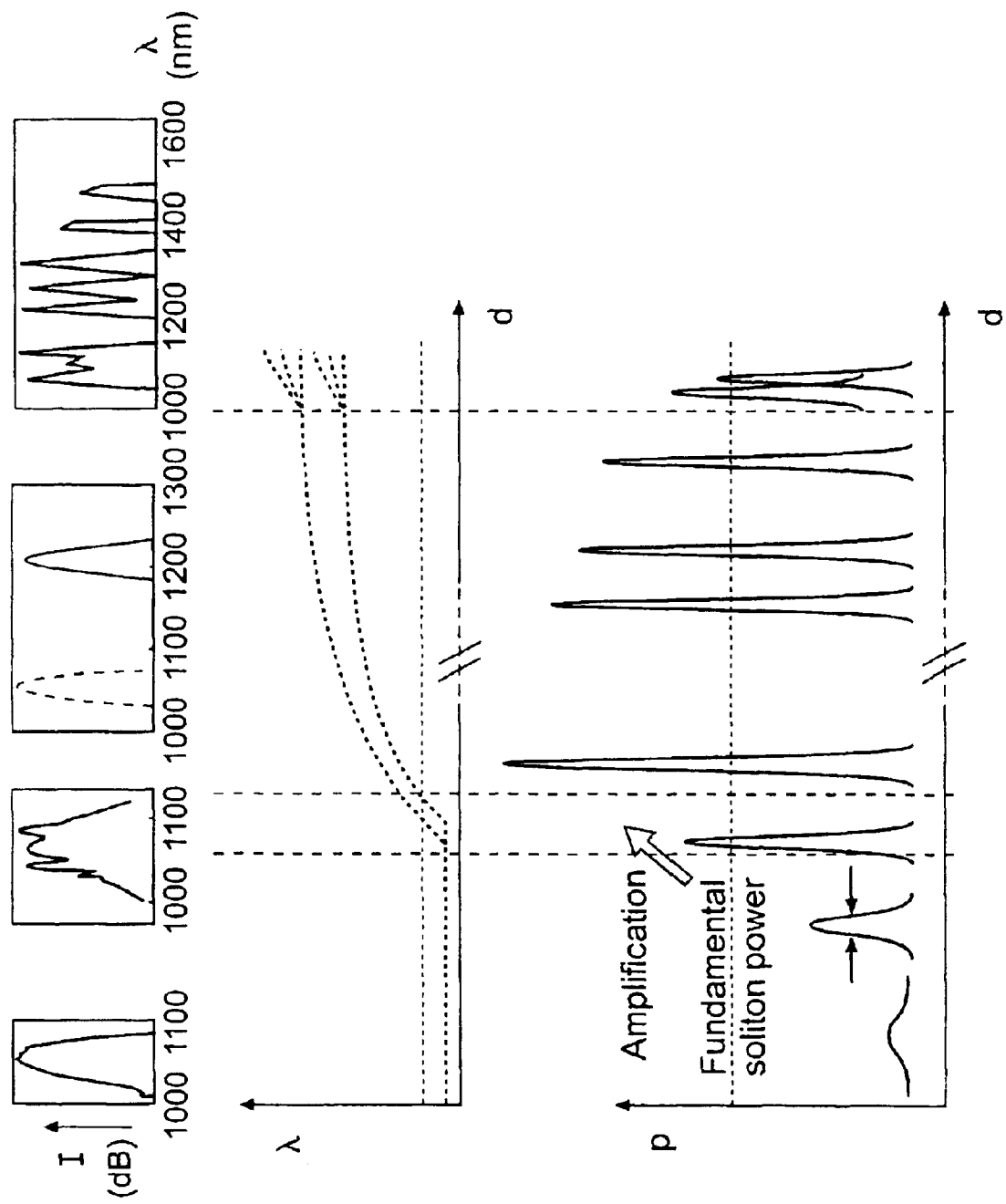
FIG. 9 shows figurative depictions of pulse evolution in the holey fiber of FIG. 5, in the temporal and spectral domains.

FIG. 9 shows figurative illustrations to depict the evolution of the pulses 43 as they propagate along the holey fiber 48. FIG. 9(a) shows the evolution of the pulse power P with propagation distance d, to indicate how the pulses 43 change in the time domain. FIG. 9(b) shows the evolution in the spectral domain, as a plot of pulse wavelength λ with propagation distance d. The upper curve represents the frequency-shifted soliton, whilst the lower curve represents the residual power remaining at the first wavelength. FIG. 9(c) shows a series of schematic spectra (spectral intensity I against wavelength λ) measured at points along the fiber, to show the effect of the soliton formation and frequency shift As can be seen from FIG. 9(a), in the time domain, the pulse duration initially decreases due to linear pulse compression over the first few tens of centimetres of the amplifier 14 since the holey fiber 48 has anomalous dispersion (~100 ps/(nm.km)), which compensates the initial positive chirp of the pulses 43. At this stage, there is no nonlinear distortion of the initial, smooth spectrum. Then, as the pulse is progressively amplified and compressed the peak power rapidly increases and soon exceeds the threshold for nonlinear interactions and the formation of a fundamental, and then (possibly) a higher order soliton. The higher order soliton pulse evolution is manifested in the temporal domain where the pulse 43 undergoes soliton compression, so further increasing the peak power and accelerating the nonlinear pulse evolution.

The effects of intra-pulse stimulated Raman scattering begin to transfer the energy from the high-frequency part of the pulse spectrum to the low-frequency part. This destabilises the pulse and ultimately results in break up of the pulse into a peak and pedestal, and most importantly, to the formation of a Raman soliton. The Raman soliton pulse is a stable entity, which, due to the SSFS effect, continuously downshifts its central frequency (moves to longer wavelengths) as it moves along the amplifier 14.

The final wavelength of the solitons at the amplifier output is sensitive to the amplifier gain settings i.e. gain distribution, pump power and the amplifier length. The gain window of the $Yb^{3+}$-doped amplifier extends from approximately 1.03–1.12 µm, so the wavelength-shifting soliton experiences further gain after formation until either the amplifier gain is saturated, or the pulse wavelength is red-shifted beyond the gain window. Once the SSFS has shifted the wavelength of the pulses beyond the ~1.12 µm upper limit of the amplifier gain spectrum, the soliton is not further amplified, nor does it suffer absorption due to the $Yb^{3+}$ doping, and propagates as if it was in a passive holey fiber. However, the $Yb^{3+}$-doped core will continue to act only on the non-Stokes-shifted pedestal of the initial pulse that is left after the Raman-soliton has been generated. By using an over-long amplifier, the excess (unpumped) length acts as an absorber for residual unshifted radiation at the seed wavelengths, whilst passing with minimal attenuation the SSFS, red-shifted components which fall outside the $Yb^{3+}$ absorption band. This leaves a spectrally filtered, wavelength-shifted Raman soliton 18 at a second wavelength, at the amplifier output.

Under certain conditions, which will be discussed in more detail later, the soliton may break up into a number of separate pulses at different wavelengths, as represented in the right hand side of FIG. 9.

The maximum wavelength shift of the Raman soliton increases steadily with the length of fiber used, so, in a silica fiber, the maximum obtainable wavelength will, in principle, have an upper bound set by the absorption of silica, at around 2.3 µm. Other factors may limit the maximum wavelength in practice, such as the variation of the fiber dispersion over the wavelength range of interest. Hence, the holey fiber is selected to have anomalous dispersion over at least the whole of the wavelength range of interest, that is, from the wavelength of the ultrashort pulses generated by the optical source (first wavelength) to the maximum wavelength to which it is desired to shift the pulses (second wavelength).

While the description given above is purely qualitative, it should be noted that detailed models have been applied numerically to describe Raman soliton formation in fiber amplifiers. For example, an approach based on a modified Nonlinear Schrodinger equation, which incorporates terms to describe a gain medium with a Lorentzian line shape and allows for the effects of gain saturation along the amplifier length can be used. This model treats the stimulated Raman scattering using an optically driven molecular vibration model. Other possible simulations consider the propagation of pulses having a width approximately equal to the inverse bandwidth of the amplifier, and suggest that the Maxwell-Bloch equations are necessary if an accurate quantitative analysis of the system is required. Such theoretical approaches, with the inclusion of appropriate gain spectra as a function of amplifier length, could be adapted to model the present invention, although this has not been done at the time of writing.

Results

Using a 4.7 m length of holey fiber 48 in the amplifier 14, it is possible to obtain a pulsed output of which the following measurements represent typical examples.

Figure 10:
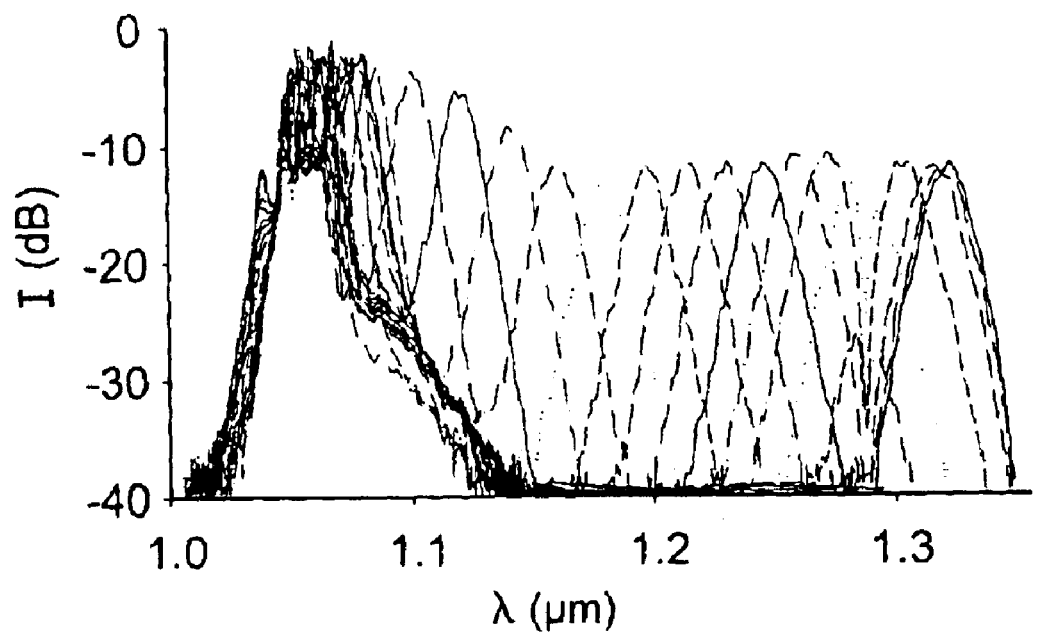
FIG. 10 shows a plurality of measured spectra of pulses produced by the source of FIG. 1, obtained by tuning the source.

FIG. 10 shows a series of superposed spectra (intensity I against wavelength λ) of the pulses 18 emerging from the amplifier 14. The successive spectral peaks (increasing in wavelength) indicate the tuning of the output wavelength as the power of the pump radiation 49 delivered to the holey fiber 48 is increased. As can be seen from FIG. 10, a single, spectrally distinct Raman soliton of ~20 nm bandwidth is generated at the amplifier output. This occurs for pump radiation powers above the minimum threshold power required to obtain appreciable SSFS effects, which in this case is >50 mW incident pump radiation power. As the pump radiation power is increased, the final wavelength of the pulses progressively increases. Residual radiation at the original first wavelength of ~1.06 μm remains in each instance.

Figure 11:
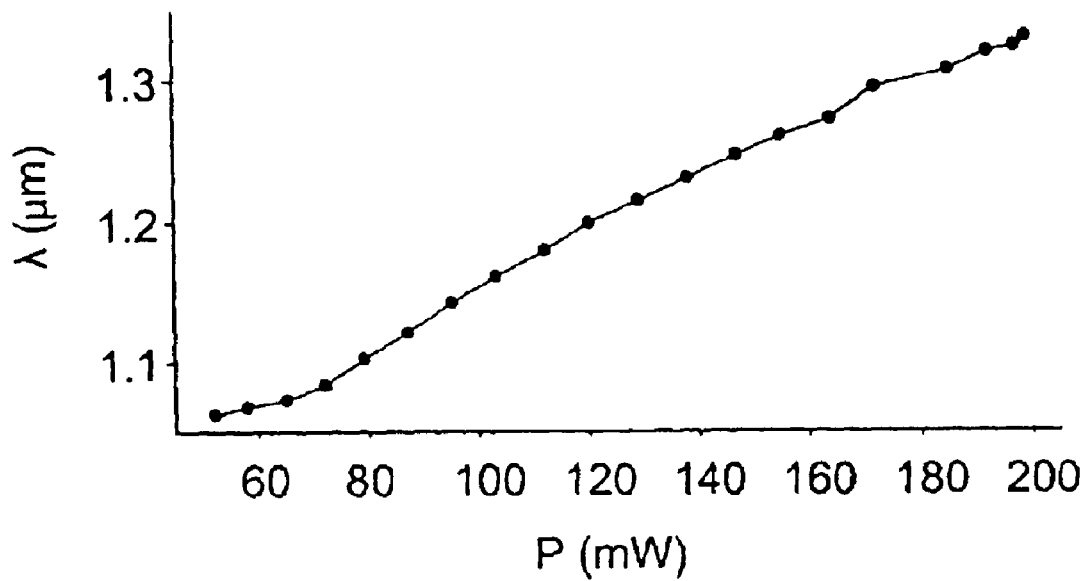
FIG. 11 shows a tuning curve indicating the center wavelengths of the spectra of FIG. 10 against the amplifier pump power required to generate them.

FIG. 11 shows a plot of the dependence of the final wavelength λ against incident pump radiation power P. The final central wavelength of the pulses is seen to vary in an almost linear fashion with the level of incident pump radiation power.

The increase in soliton wavelength with pump power is attributed to the fact that at higher pump powers the resultant change in gain distribution causes the Raman solitons to form earlier within the holey fiber, thereby leaving the solitons a greater length of fiber within which to walk-off to longer wavelengths through SSFS. The roll-off in peak spectral intensity with increased pump power observed in FIG. 10 is consistent with this explanation, since the earlier the pulses get shifted out of the amplifier gain bandwidth the lower the overall amplification experienced by the pulse, and the greater the red-shift.

Figure 12A:
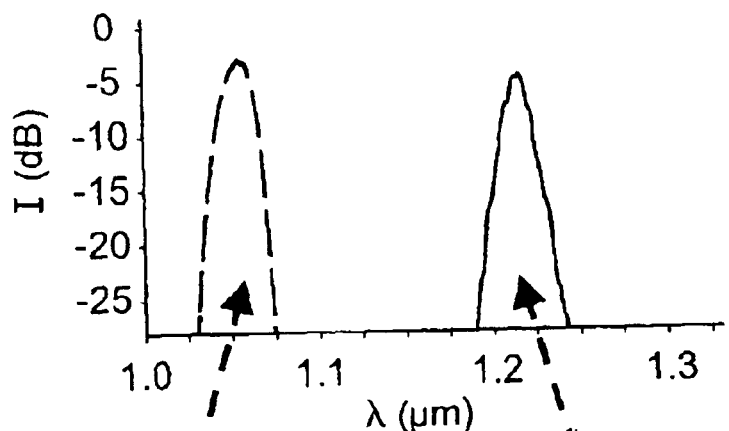
FIG. 12 shows spectra and autocorrelations of pulses generated by the optical source of FIG. 2 and the source of FIG. 1.
Figure 12B:
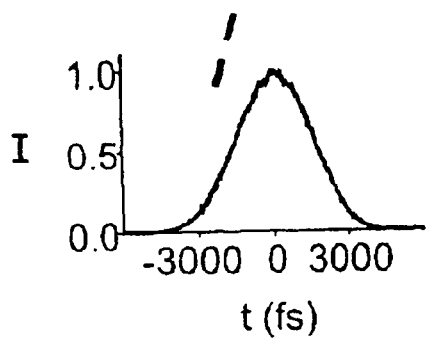
Figure 12C:
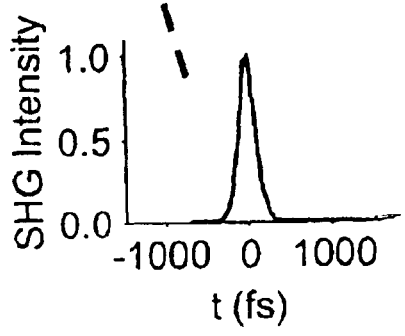
Figure 13:
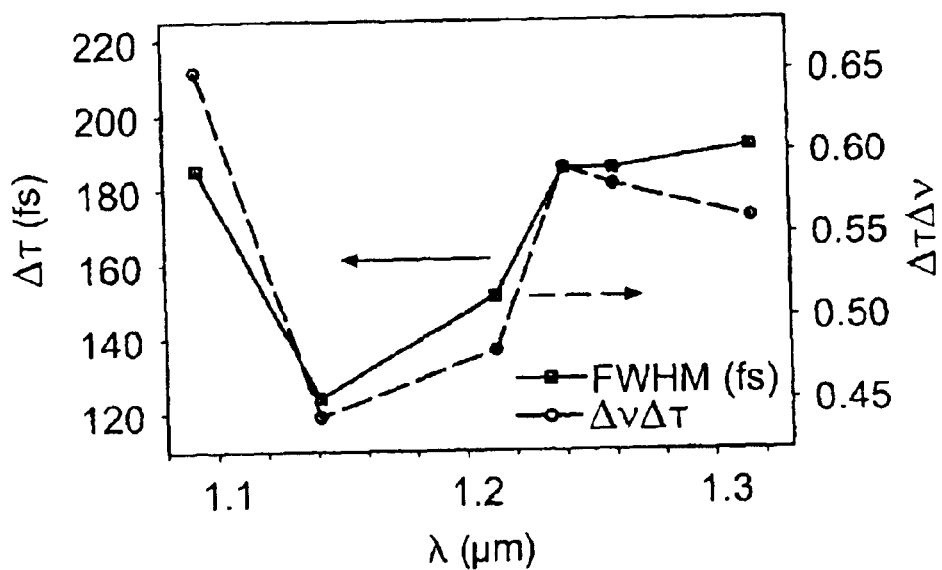
FIG. 13 shows a plot of pulse characteristics against wavelength for pulses generated by the source of FIG. 1.

FIGS. 12 and 13 show the results of pulse autocorrelation measurements for pulses at various output wavelengths, which indicate how the pulse quality varies across the tuning range.

FIG. 12(a) shows spectra (as plots of intensity I against wavelength λ) of the pulses from the optical source at the first wavelength, of 1.06 μm, and of pulses output from the amplifier, at a second wavelength of 1240 nm. FIG. 12(b) shows the autocorrelation (SHG intensity I against delay t) of the 1.06 μm pulses, and FIG. 12(c) shows the autocorrelation (SHG intensity I against delay t) of the 1240 nm pulses. This illustrates the typical pulse quality of the shifted pulses. The pulse duration at 1240 nm in this example is 150 fs, and the time bandwidth product is 0.48.

FIG. 13 the variation of pulse duration Δτ and time bandwidth product ΔτΔν with second wavelength λ. These measurements show that the pulse duration remains approximately constant at ~180 fs FWHM as the second wavelength is tuned, and that the pulse quality as defined by the time bandwidth product remains high across the full tuning range.

It is also possible to use the configuration of the first embodiment to obtain temporal compression (through multi-soliton effects) of the ultrashort pulses from the optical source 14, as a function of pump radiation power. By changing both the chirp of the input pulses, and the length of amplifier holey fiber it is possible to investigate the optimum conditions for pulse compression. The chirp of the input pulses is optimised by extracting negatively chirped pulses from the optical source, and transforming these pulses to have a small positive chirp by propagation through a length of standard fiber. Cutback measurements can then be performed to obtain pulses of the desired duration and hence chirp. In a similar fashion, the amplifier holey fiber length is optimised with respect to the minimum pulse duration at the amplifier output by measuring the duration of the output pulses in a series of cutback measurements on the amplifier holey fiber. By launching the optimally chirped pulses (~0.02 ps/nm) pulses into a 2.8 m long holey fiber amplifier, it is possible to obtain compressed pulses down to 67 fs FWHM. Although it is expected that the soliton formation process in this mode of operation is broadly similar to that described above, the chirp of the input pulses is more rapidly compensated (by the anomalous dispersion of the holey fiber) in a shorter length of amplifier holey Fiber because it is smaller. Break-up into multiple solitons is prevented because the pulses exit the amplifier before evolving beyond the temporally compressed state.

Figure 14A:
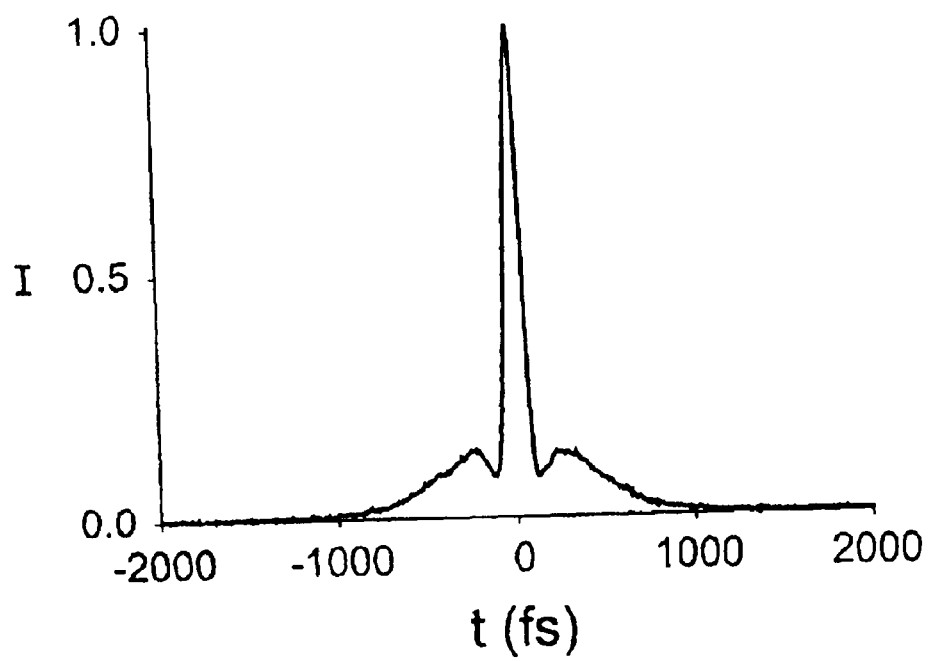
FIG. 14 shows an autocorrelation and spectrum of temporally compressed pulses generated by the source of FIG. 1.

FIG. 14 shows measurements taken of the compressed pulses. FIG. 14(a) shows an autocorrelation (SHG intensity I against delay t) of the pulses, indicating the 67 fs pulse width. This compares with a minimum pulse duration of 110 fs obtainable using linear dispersion compensation of the ultrashort pulses directly from the optical source (using a diffraction grating pair).

Figure 14B:
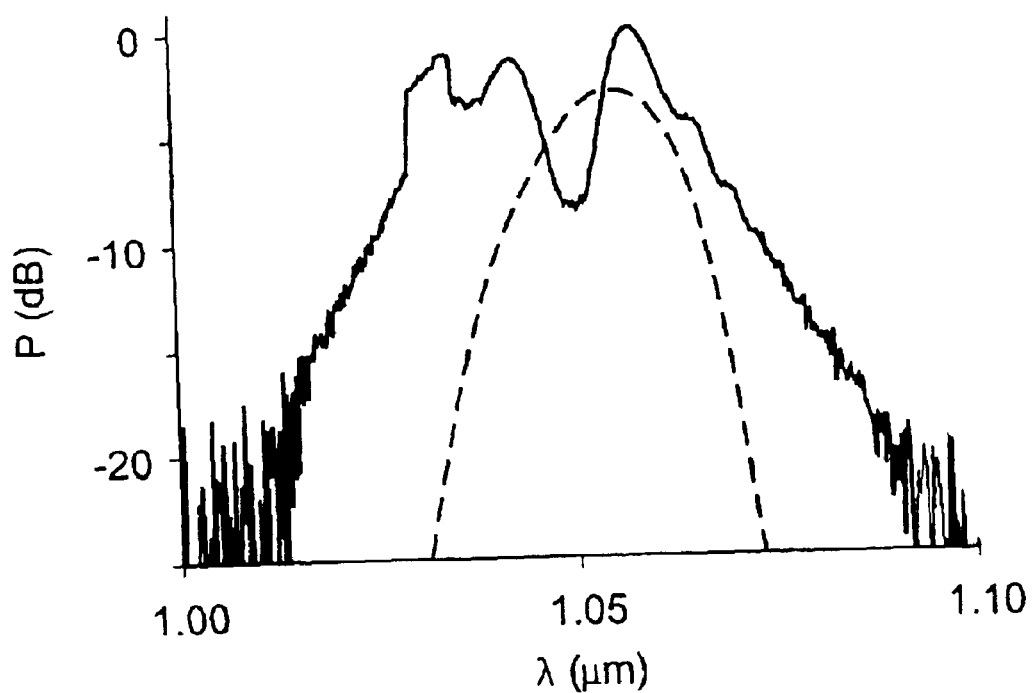

FIG. 14(b) shows a spectrum of the compressed pulses (power P against wavelength λ), with the spectrum of the original uncompressed pulses shown as a dotted line for comparison.

Further Embodiments

Reverse-pumped Amplifier Configuration

It is possible to obtain an output of tunable soliton pulses by reconfiguring the components of the first embodiment so that the amplifier 14 is reverse-pumped. In other words, the pump radiation 49 is directed into the holey fiber 48 from the opposite end to that into which the pulses from the optical source are directed.

Figure 15:
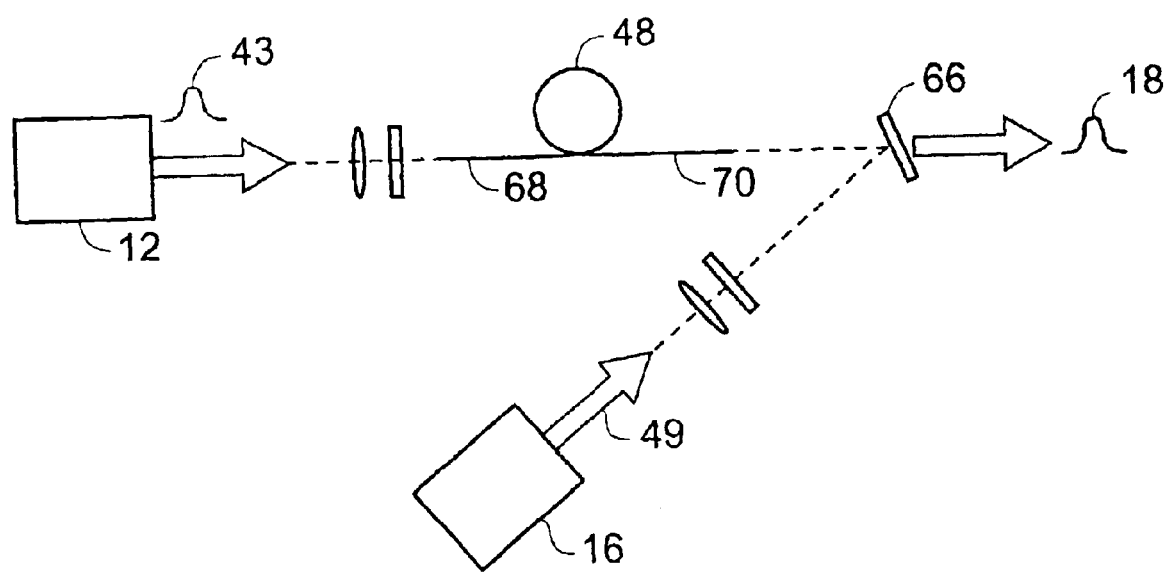
FIG. 15 shows a schematic diagram of a source of optical pulses according to a further embodiment of the present invention.

FIG. 15 shows a schematic diagram of such a reverse pumping configuration. The output beam of the optical source 12 is, as before, collimated and passed through a half-wave plate before entering the holey fiber 48 through a first end 68. The pump radiation 49 from the pump laser 16 is also collimated and passed through a half-wave plate as before, and is directed into a second end 70 of the holey fiber 48 by means of a dichroic mirror 66. Thus the pump radiation 49 and the pulses 43 counterpropagate in the holey fiber 48. The final output of the amplifier, as the second wavelength, leaves the holey fiber 48 through the second end 70, and is transmitted through the dichroic mirror 66.

As an example of the operation of this configuration, using the 2.4 ps, linearly chirped pulses 43 directly from the mode-locked laser 12 and launching them into a 1.7 m length of holey fiber 48, it is possible to obtain similar SSFS tuning to that shown in FIGS. 10 and 11. However, the maximum wavelength shift is only to 1.12 μm. The wavelength tuning range is therefore narrower when compared to that achieved for the forward pumping arrangement of the first embodiment. The reduction in wavelength tuning range is understandable since in this reverse-pumping configuration any unbleached length of $Yb^{3+}$-doped holey fiber 48 at the front of the amplifier 14 absorbs the pulses 43, thereby frustrating soliton formation early within the holey fiber 48. The effective length of fiber available for wavelength shifting through SSFS is therefore reduced compared to the forward-pumping configuration.

Indeed, it has been found that forward pumping an approximately 4 m length of holey fiber 48 in the amplifier 14 is the optimal configuration for producing single color, wavelength tuneable solitons, using the various components described in the first embodiment.

It should be noted that due to the practical difficulties of working with the small core fibers described herein, compounded by the issue of pulse break-up and wavelength shift within the amplifier, it is impractical to quantify the precise gain experienced by a given pulse for a given pump power and amplifier configuration. However, it is possible to state that for the results presented thus far, the maximum overall single pass gain through the source of optical pulses is generally greater than approximately 17 dB. This estimate considers an amplifier arrangement with a flat cleaved facet at the holey fiber input (to maximise the launched pulses), which would provide 4% feedback; and an angle cleaved (reducing feedback to <1%) at the output end of the holey fiber. In each amplifier configuration it has been possible to increase the pump radiation power sufficiently in order to obtain laser operation (at some wavelength within the $Yb^{3+}$ bandwidth) from the source, so for the end-reflections as stated above, this indicates at least 17 dB gain. Further improvements in end reflection suppression are anticipated in the future as end termination techniques for holey fibers are improved.

Multi-wavelength Output and Generation of Broadband Continuous Spectra

By altering the optical pulse energies, the amplifier length, and the pump radiation power, it is possible to enter a more complicated regime of pulse evolution where the pulse breaks up into multicolored solitons at the amplifier output. Using the configuration of the first embodiment, it is possible to form pulse-bursts with as many as six individual multicolored pulses, and in some instances wavelengths approaching 1.58 $\mu$m are observed. Here, the optical pulse (or a previously formed Raman soliton) breaks up into several Raman solitons, each of which will have somewhat different characteristics at the point of formation and that will evolve separately with further propagation. A burst of multi-colored solitons is thus observed at the end of the amplifier.

Using the configuration of the first embodiment, when the output power of the optical source 12 is maximised, to increase the launched pulse energy to ~12 pJ (compared to ~9 pJ for the single-color soliton operation described above) the generation of multicolor pulses (separated in wavelength and time) is observed. The pulses increase in number as the pump radiation power is increased.

Figure 16A:
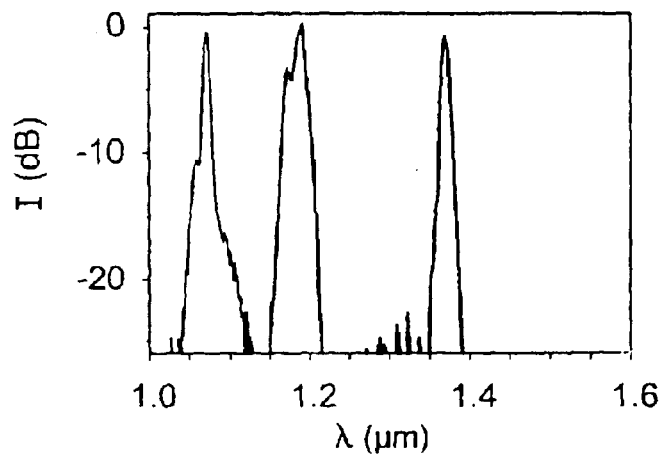
FIG. 16 shows spectra of pulses generated by a source of optical pulses according to a still further embodiment of the present invention.
Figure 16B:
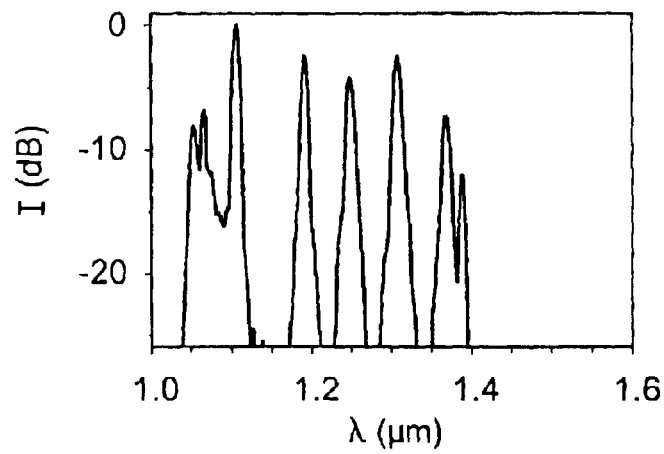
Figure 16C:
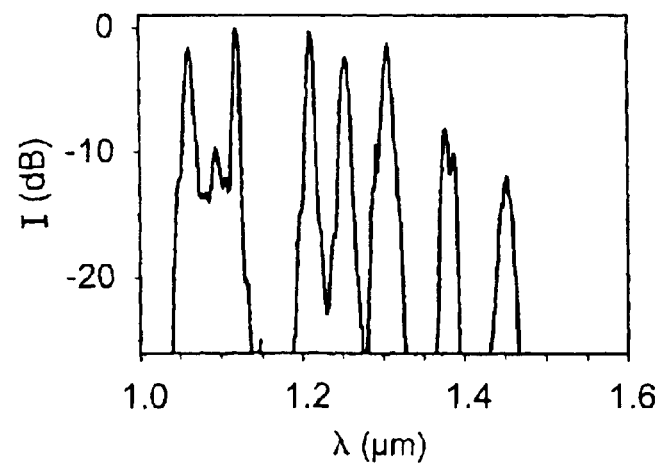

FIG. 16 shows three examples of spectra (intensity I against wavelength $\lambda$) of these multicolor pulses. The pump radiation power is increased from FIG. 16(a) to FIG. 16(c), which show an increasing number of pulses at varying wavelengths across the wavelength range covered by the tuning of the source for single-color operation.

By using the configuration of embodiment 1 with a longer. (9 m) length of holey fiber 48, and operating at the highest available pump radiation powers, outputs with more complex spectra can be generated. These include increased numbers of multi-color solitons, and a broadband continuous (time-averaged) optical spectrum. The latter is similar to that which can be achieved in supercontinuum generation experiments using passive holey fiber devices.

Figure 17A:
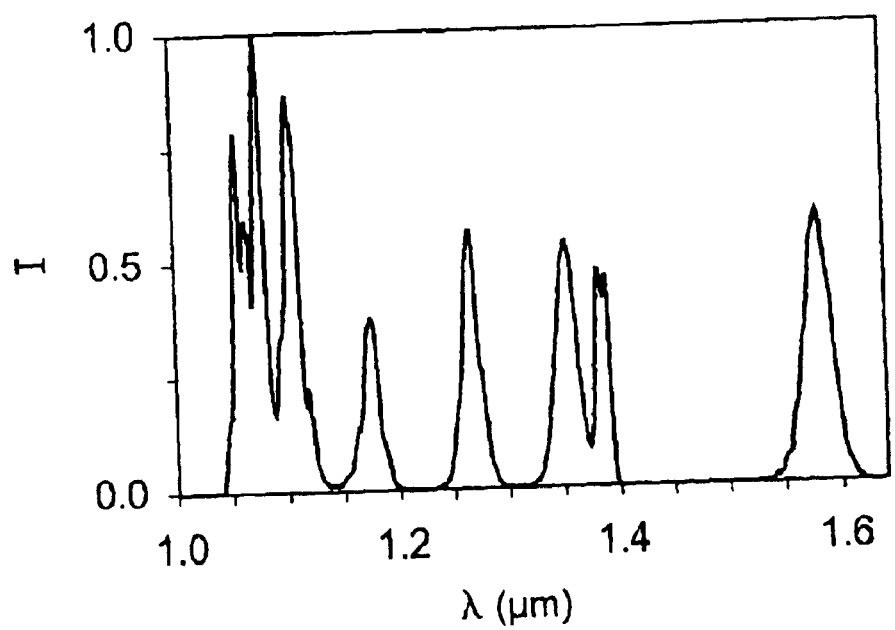
FIG. 17 shows spectra of pulses generated by a source of optical pulses according to a yet further embodiment of the present invention.
Figure 17B:
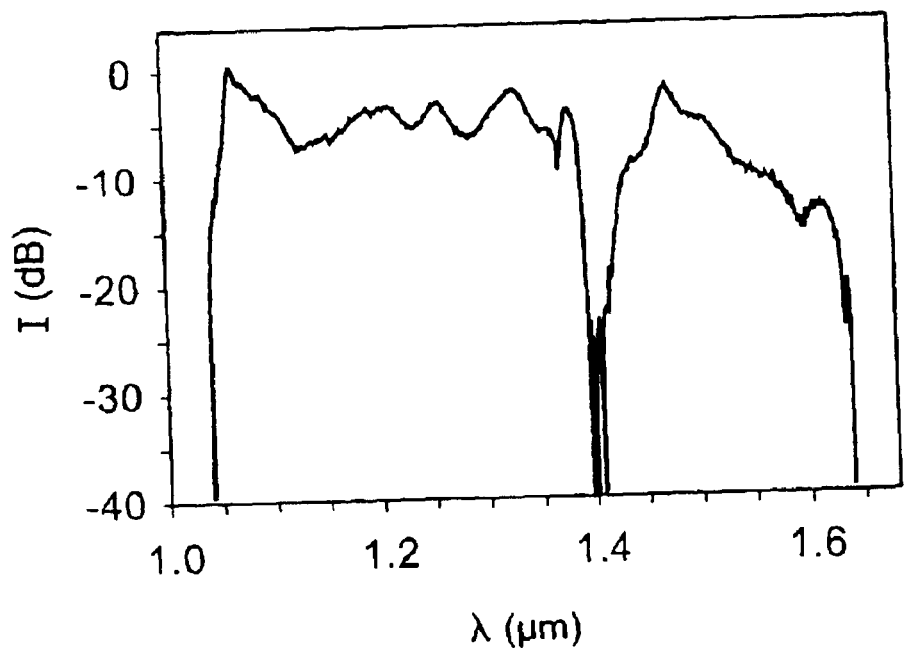

FIG. 17 shows example spectra of such outputs, as plots of intensity I against wavelength $\lambda$. FIG. 17(a) shows a complex multi-color soliton spectra, with a greater maximum wavelength shift, up to 1.58 $\mu$m, than that available under single-color soliton operation (measuring the peak with the maximum red-shift). FIG. 17(b) shows a typical example of a broadband continuous spectrum, with wavelengths extending from 1.03 $\mu$m to 1.62 $\mu$m (the dip at 1.4 $\mu$m is caused by water absorption). A broad spectrum of this type has applications such as optical coherence tomography, in spectroscopy and also in metrology, owing to the "frequency comb" incorporated in the spectrum of a supercontinuum. At present this mode of operation of the source is not fully understood.

Pre-amplification

To tailor the output of the source of optical pulses in a particular way, it may be desirable to increase the energy of the pulses generated by the optical source 12. For example, generation of a broadband output may be required, which cannot be obtained using the pulse energies available directly from the particular optical source used. Also, use of higher energy pulses can allow a shorter length of holey fiber to be used in the amplifier.

Consequently, a further embodiment of the present invention includes a pre-amplifier situated between the optical source and the amplifier, and operable to amplify the ultrashort optical pulses before they are introduced into the holey fiber.

Figure 18:
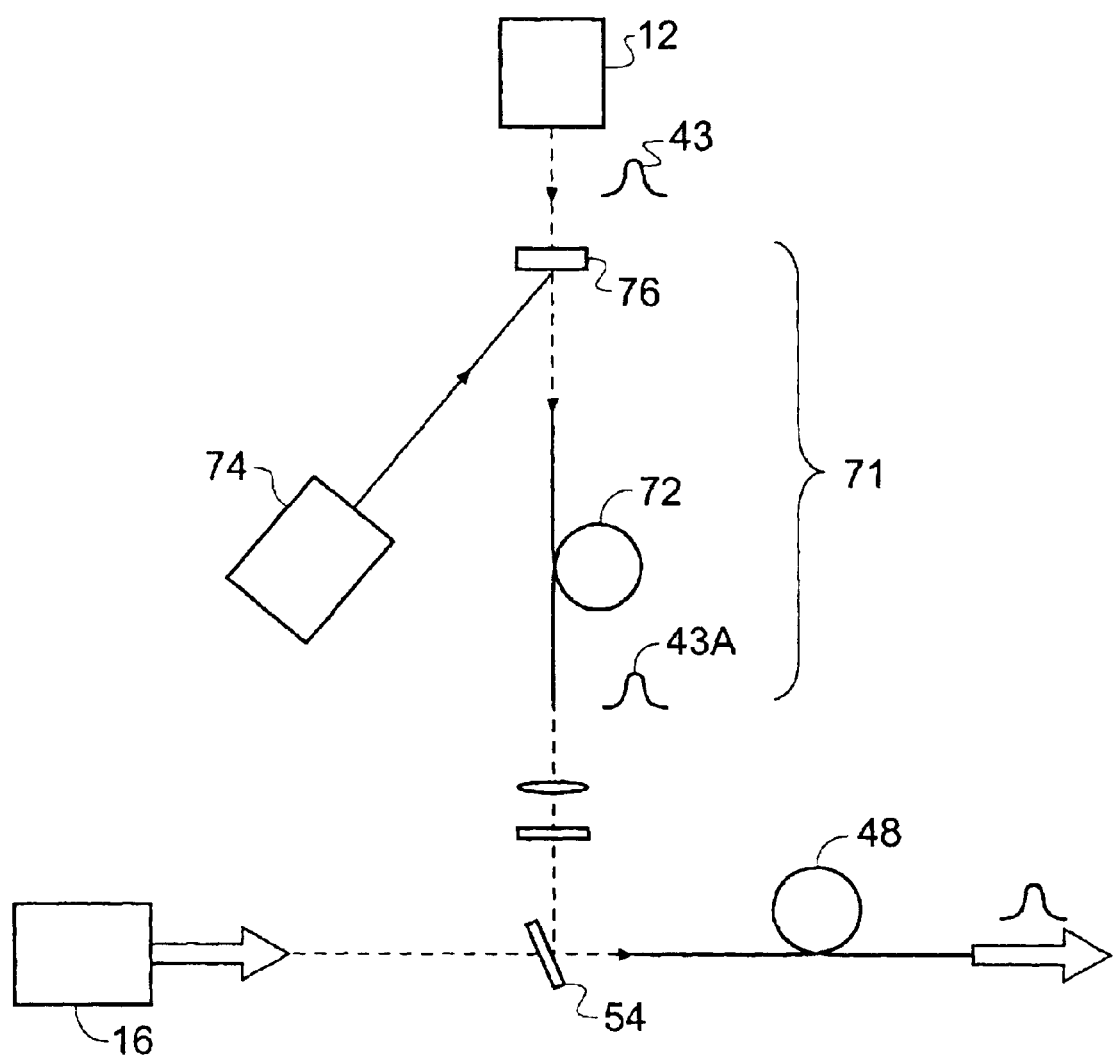
FIG. 18 shows a schematic diagram of a source of optical pulses according to a yet further embodiment of the present invention.

FIG. 18 shows a schematic diagram of an embodiment including a preamplifier. A fiber pre-amplifier 71 is provided to receive the ultrashort pulses 43 generated from the optical source 12. In the case of the optical source being a $Yb^{3+}$-doped fiber laser, the pre-amplifier may have as its gain medium a fiber 72 doped with $Yb^{3+}$ ions, to give the necessary gain at 1.06 $\mu$m. The pre-amplifier 71 has a pump laser 74, such as a single mode semiconductor laser, to generate pump light which is coupled into the fiber 72 co-directionally with the pulses 43, via a dichroic mirror 76. Other coupling arrangements are also possible, such as a fiber coupler. On leaving the preamplifier, the amplified ultrashort pulses 43a are coupled into the holey fiber as described before.

Alternatively, a bulk optic amplifier may be used to provide the pre-amplification.

Other Wavelengths

The present invention is not limited to the generation of pulses tunable between 1.06 and 1.33 $\mu$m, as generated by the first embodiment. Any source of ultrashort optical pulses can be used as the optical source 12, in combination with an amplifier based on a fiber having the suitable properties for SSFS to occur. The fiber needs to have gain at the wavelength of the pulses produced by the optical source, to provide the amplification necessary to reach the energy levels for solitons to be formed. Also, the fiber needs to have anomalous dispersion at the pulse wavelength, and also over the desired extent of the wavelength shift, so that SSFS can take place. As previously stated, holey fibers as used in the present invention are ideally suited for SSFS, because they can be tailored to give anomalous dispersion over virtually any wavelength range desired. Consequently, a holey fiber can be suitably tailored and doped with appropriate ions to give gain at the wavelength of the optical source to be used. For example, a modelocked erbium-doped fiber laser can be used as the optical source, thus generating pulses at a wavelength of ~1.5 $\mu$m, together with a holey fiber having a core doped with erbium ions to give gain at 1.5 $\mu$m, and tailored to have anomalous dispersion at, for example, 1.4 $\mu$m to 2 $\mu$m, so as to give an output of solitons tunable from 1.5 $\mu$m to 2 $\mu$m.

Other possible dopants for the holey fiber, to give gain at the appropriate wavelength, include erbium, neodymium, ytterbium, holmium, thulium, praseodymium, germanium, aluminium, boron, samarium, lead and tin. In addition to enhancing or extending the optical gain, dopants can also be used to enhance the Raman gain and/or the nonlinear coefficient. Furthermore, aluminium, for example, can be used to extend the optical gain bandwidth provided by rare earth dopants.

Fiber Types

As mentioned, holey fibers are extremely versatile and can be fabricated so as to have a wide range of properties, including a desired dispersion characteristic. Therefore, the present invention is not limited to the use of holey fibers having the structure shown in FIG. 5, and fabricated by standard capillary stacking techniques. Other fabrication techniques may be used, such as methods based on extrusion, milling, drilling or built-in casting. Similarly, a wide range of fiber microstructures can be used to give the desired gain, nonlinear and dispersive properties. Examples of other holey fiber structures include small core, core-pumped holey fibers and air clad, cladding-pumped fibers.

Figure 19:
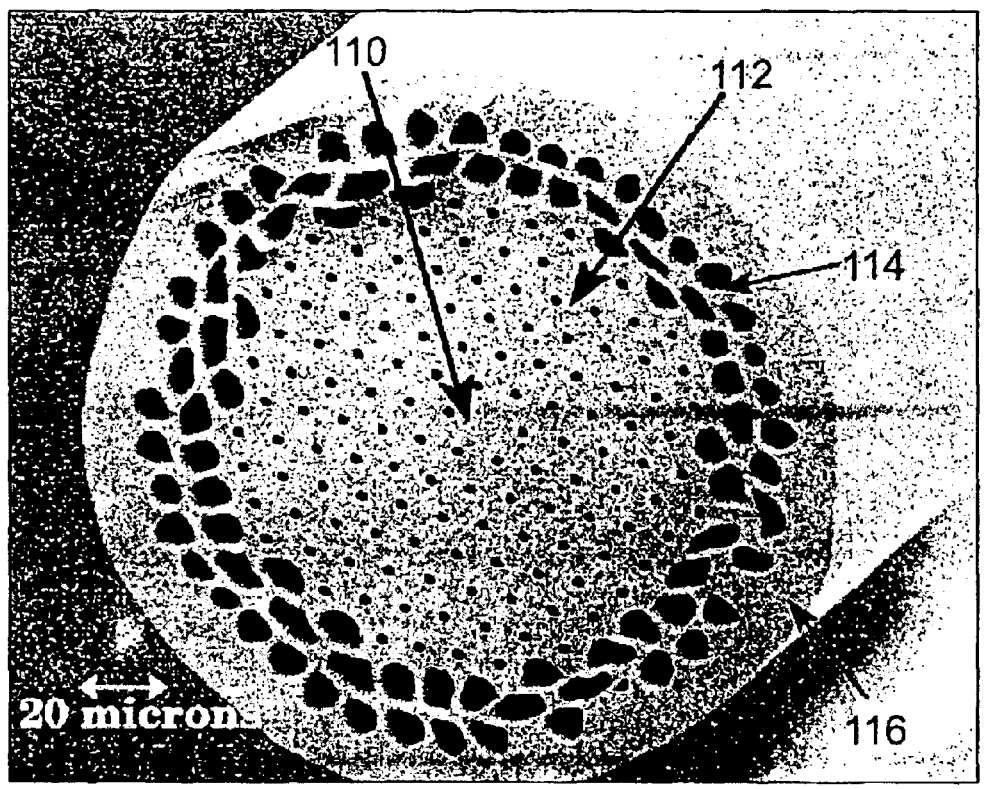
FIG. 19 shows a scanning electron micrograph of a transverse cross-section of an example of an alternative type of holey fiber that may be used in the present invention.

FIG. 19 shows a scanning electron micrograph of a transverse cross-section of an example of an air-clad, cladding-pumped holey fiber. The fiber has a core 100, an inner cladding 112, an outer cladding 114 and an outer jacket 116.

Figure 20:
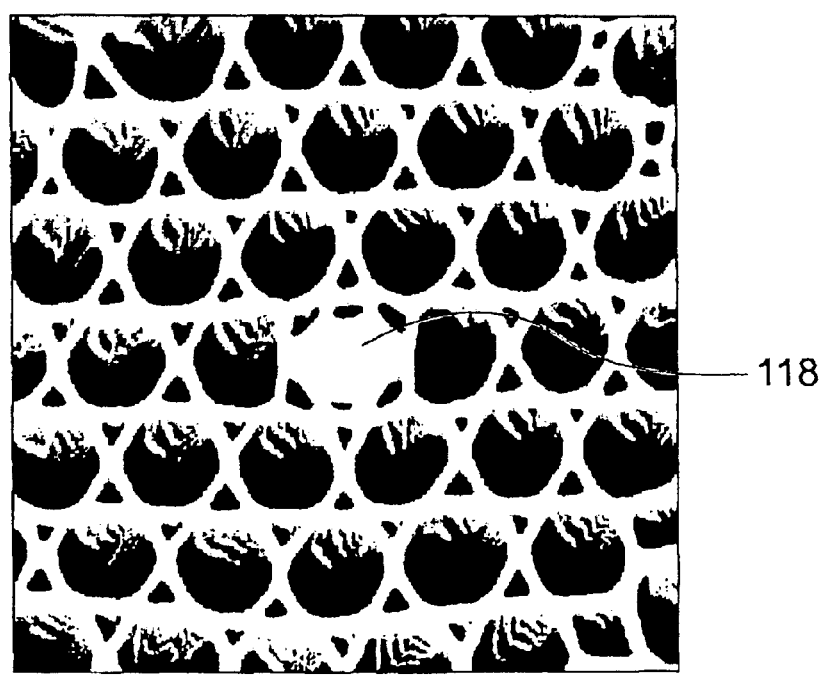
FIG. 20 shows a scanning electron micrograph of a detail from a transverse cross-section of a further example of an alternative type of holey fiber that may be used in the present invention.

FIG. 20 shows a scanning electron micrograph of a detail from a transverse cross-section of an example of a small core, core-pumped holey fiber, in which the core 118 can be seen.

Furthermore, the tailoring of the fiber to achieve the desired characteristics is not limited to the use of holey fibers. Similar characteristics may also be obtained by the tapering of fibers, which may or may not be microstructured in addition Hence, the present invention may be realised with a fiber amplifier having a tapered fiber instead of the holey fiber described thus far. Tapering of the fiber greatly reduces the cross-sectional area of the core, which affects the dispersion properties and mode area.

Also, fibers fabricated from materials other than silica may be suitable for particular applications. It is also possible to envisage such fibers produced in glasses other than silica based glasses. Such compound glass types include lead doped glasses such as SF57, SF58, and SF59 (each commercially available through Schott Glass Ltd), bismuth-doped glasses, chalcogenide glasses, and halide based glasses. For example, fluoride fibers may be used if it is desirable to use a dopant in the fiber core which has a low laser energy transition $\Delta E$, or for upconversion amplifiers operating in visible regions of the spectrum. It is also possible to use polymers to produce holey fiber structures.

References

[1] N. Nishizawa and T. Goto, "Compact system of wavelength-tunable femtosecond soliton pulse generation using optical fibers," IEEE Photonics Technology Letters 11, 325–327 (1999).
[2] EP-A1-1,118,904
[3] M. E. Fermann, A. Galvanauskas, M. L. Stock, K. K. Wong, D. Harter and L. Goldberg, "Ultrawide tunable Er soliton fiber laser amplified in Yb-doped fiber," Optics Letters 24, 1428–1430 (1999).
[4] X. Liu, C. Xu, W. H. Knox, J. K. Chandalia, B. J. Eggleton, S. G. Kosinski and R. S. Windeler, "Soliton self-frequency shift in a short tapered air-silica microstructure fiber," Optics Letters 26, 358–360 (2001).

J. K. Ranka, R. S. Windeler and A. J. Stentz, "Visible continuum generation in air-silica microstructure optical fibers with anomalous dispersion at 800 nm," Optics Letters 25, 25–27 (2000).

What is claimed is:

1. A source of optical pulses, comprising:
an optical source operable to generate ultrashort optical pulses at a first wavelength; and
an optical fiber amplifier comprising an optical fiber and a pump source operable to deliver pump radiation to the optical fiber, the optical fiber being a microstructured fiber containing an array of air holes running along the length of the fiber and having a core containing a dopant to provide optical gain at the first wavelength, and anomalous dispersion over a wavelength range including the first wavelength and a second wavelength, and being arranged to receive the ultrashort optical pulses, amplify the ultrashort optical pulses, and alter the wavelength of the ultrashort optical pulses to at least the second wavelength by the soliton-self-frequency shifting effect.

2. The source of optical pulses according to claim 1, in which the dopant comprises ytterbium ions, to provide optical gain at a wavelength of approximately 1 $\mu$m.

3. The source of optical pulses according to claim 1, in which the dopant comprises ions of one or more of erbium, neodymium, ytterbium, holmium, thulium, praseodymium, germanium, aluminium, boron, samarium, lead and tin.

4. The source of optical pulses according to claim 1, in which the optical source comprises a laser having an optical gain medium in the form of an optical fiber.

5. The source of optical pulses according to claim 4, in which the laser has an optical gain medium comprising an optical fiber doped with ions of ytterbium and operable to generate ultrashort optical pulses at a wavelength of approximately 1 $\mu$m.

6. The source of optical pulses according to claim 1, in which the pump radiation delivered to the optical fiber can be varied in power, so as to vary the second wavelength within the wavelength range of the anomalous dispersion of the optical fiber of the optical fiber amplifier.

7. The source of optical pulses according to claim 1, in which the ultrashort optical pulses are delivered to the optical fiber of the optical fiber amplifier with sufficient power for the soliton-self-frequency shifting effect to alter the wavelength of the ultrashort pulses to the second wavelength and to one or more additional wavelengths within the wavelength range of the anomalous dispersion of the optical fiber of the optical fiber amplifier.

8. The source of optical pulses according to claim 1, in which the ultrashort optical pulses are delivered to the optical fiber of the optical fiber amplifier with sufficient power for the soliton-self-frequency shifting effect to alter the wavelength of the ultrashort pulses to a broadband continuous spectrum.

9. The source of optical pulses according to claim 1, and further comprising an optical pre-amplifier operable to receive the ultrashort optical pulses from the optical source and amplify the ultrashort optical pulses before the ultrashort optical pulses are received by the optical fiber of the optical fiber amplifier.

10. The source of optical pulses according to claim 9, in which the optical pre-amplifier comprises an optical fiber amplifier.

11. The source of optical pulses according to claim 9, in which the optical pre-amplifier comprises a bulk optic amplifier.

12. A method of producing optical pulses, comprising
generating ultrashort optical pulses at a first wavelength;
amplifying the ultrashort optical pulses in an optical fiber amplifier; and
altering the wavelength of the ultrashort optical pulses from the first wavelength to at least a second wavelength by the soliton-self-frequency shifting effect within the optical fiber amplifier;
the optical fiber amplifier comprising an optical fiber being a microstructured fiber containing an array of air holes running along the length of the fiber and having a core containing a dopant to provide optical gain at the first wavelength, and anomalous dispersion over a wavelength range including the first wavelength and a second wavelength.

13. The method of producing optical pulses according to claim 12, and further comprising varying an amount of pump radiation delivered to the optical fiber amplifier so as to vary the second wavelength.

14. The method of producing optical pulses according to claim 12, in which the ultrashort optical pulses are generated from a laser having an optical gain medium in the form of an optical fiber.

15. The method of producing optical pulses according to claim 14, in which the ultrashort pulses are generated at a wavelength of approximately 1 μm from a laser having an optical gain medium in the form of an optical fiber doped with ions of ytterbium.

16. The method of producing optical pulses according to claim 12, and further comprising delivering the ultrashort optical pulses to the optical fiber amplifier with sufficient power for the soliton-self-frequency shifting effect to alter the wavelength of the ultrashort pulses to the second wavelength and to one or more additional wavelengths within the wavelength range of the anomalous dispersion of the optical fiber of the optical fiber amplifier.

17. The method of producing optical pulses according to claim 12, and further comprising delivering the ultrashort optical pulses to the optical fiber amplifier with sufficient power for the soliton-self-frequency shifting effect to alter the wavelength of the ultrashort pulses to a broadband continuous spectrum.

18. The method of producing optical pulses according to claim 12, and further comprising amplifying the ultrashort optical pulses in an optical pre-amplifier before amplifying the ultrashort optical pulses and altering the wavelength of the ultrashort optical pulses in the optical fiber amplifier.

19. The method of producing optical pulses according to claim 18, in which the optical pre-amplifier comprises an optical fiber amplifier.

20. The method of producing optical pulses according to claim 18, in which the optical pre-amplifier comprises a bulk optical amplifier.

21. The source of optical pulses according to claim 1, wherein the optical fiber is a holey fiber.

22. The source of optical pulses according to claim 1, in which an unpumped length of the optical fiber acts as an absorber for residual unshifted radiation.

23. The source of optical pulses according to claim 1, in which the optical fiber is forward pumped.

24. A source of optical pulses, comprising:
   means for generating optical pulses at a first wavelength; and
   means for generating light at a second wavelength using the optical pulses and the soliton-self-frequency shifting effect and including an optical fiber being a microstructured optical fiber.

25. The source of optical pulses according to claim 24, further including means for generating light at a third wavelength using the optical pulses and the solition-self-frequency shifting effect and including the optical fiber.

26. The source of optical pulses according to claim 24, wherein the second wavelength is between 1.58 microns and 1.0 microns.

27. A source of optical pulses, comprising:
   an optical source operable to generate optical pulses at a first wavelength; and
   means for altering the wavelength of the optical pulses to at least a second wavelength, the means including an optical fiber being a microstructured optical fiber, and a pump source operable to deliver pump radiation to the optical fiber, the optical fiber having anomalous dispersion over a wavelength range including the first wavelength and the second wavelength.

28. The source of optical pulses according to claim 27, in which the second wavelength is tuned using a power of the pump radiation.

29. A source of optical pulses, comprising:
   means for generating optical pulses at a first wavelength; and
   means for amplifying, and altering the wavelength of, the optical pulses by using the soliton-self-frequency shifting effect within an optical fiber being a microstructured optical fiber to generate optical pulses with a second wavelength.

30. The source of optical pulses according to claim 29, in which the optical fiber provides optical gain at the first wavelength and anomalous dispersion over a wavelength range including the first wavelength and the second wavelength.

31. The source of optical pulses according to claim 30, in which the gain is at least 17 dB.

* * * * *